US 8,117,649 B2

(12) United States Patent
Hardt

(10) Patent No.: US 8,117,649 B2
(45) Date of Patent: Feb. 14, 2012

(54) DISTRIBUTED HIERARCHICAL IDENTITY MANAGEMENT

(75) Inventor: Dick C. Hardt, Vancouver (CA)

(73) Assignee: Dormarke Assets Limited Liability Company, Dover, DE (US)

( * ) Notice: Subject to any disclaimer, the term of this patent is extended or adjusted under 35 U.S.C. 154(b) by 0 days.

(21) Appl. No.: 12/851,464

(22) Filed: Aug. 5, 2010

(65) Prior Publication Data

US 2010/0306830 A1    Dec. 2, 2010

Related U.S. Application Data

(62) Division of application No. 10/455,438, filed on Jun. 6, 2003, now Pat. No. 7,793,095.

(60) Provisional application No. 60/386,256, filed on Jun. 6, 2002.

(51) Int. Cl.
*H04L 29/06* (2006.01)
*G06F 21/00* (2006.01)

(52) U.S. Cl. .................................. 726/6; 726/8; 726/26

(58) Field of Classification Search ................... 713/155, 713/161, 168, 170, 182, 183; 726/2–6, 26–30; 709/245; 705/67
See application file for complete search history.

(56) References Cited

U.S. PATENT DOCUMENTS

| | | | |
|---|---|---|---|
| 3,837,501 A | 9/1974 | Pielkenrood | |
| 4,067,813 A | 1/1978 | Pielkenrood | |
| 4,437,988 A | 3/1984 | James | |
| 4,713,753 A | 12/1987 | Boebert et al. | |
| 4,759,063 A | 7/1988 | Chaum | |
| 4,759,064 A | 7/1988 | Chaum | |
| 4,780,821 A | 10/1988 | Crossley | |
| 4,799,156 A | 1/1989 | Shavit et al. | |
| 4,914,698 A | 4/1990 | Chaum | |
| 4,949,380 A | 8/1990 | Chaum | |
| 4,991,210 A | 2/1991 | Chaum | |
| 5,487,826 A | 1/1996 | Back et al. | |
| 5,644,723 A | 7/1997 | Deaton et al. | |
| 5,677,955 A | 10/1997 | Doggett et al. | |
| 5,737,701 A | 4/1998 | Rosenthal et al. | |
| 5,774,551 A | 6/1998 | Wu et al. | |
| 5,781,629 A | 7/1998 | Haber et al. | |
| 5,794,207 A | 8/1998 | Walker et al. | |
| 5,794,259 A | 8/1998 | Kikinis | |
| 5,815,665 A | 9/1998 | Teper et al. | |
| 5,855,007 A | 12/1998 | Jovicic et al. | |
| 5,872,850 A | 2/1999 | Klein et al. | |
| 5,875,296 A | 2/1999 | Shi et al. | |

(Continued)

FOREIGN PATENT DOCUMENTS

AU    2003240323 A1    12/2003
(Continued)

OTHER PUBLICATIONS

"Non Final Office Action", U.S. Appl. No. 10/445,438, (Mar. 25, 2009), 12 pages.

(Continued)

*Primary Examiner* — Gilberto Barron, Jr.
*Assistant Examiner* — Abdulhakim Nobahar
(74) *Attorney, Agent, or Firm* — Perkins Coie LLP

(57) ABSTRACT

A system and methods for identity management and authentication are provided herein. The present invention employs shadow domains to prove entity membership in an identity management system where responsibility for trust relationships is devolved to the user. The present invention additionally teaches doubly signed certificate transmission for authentication of assertions made by third parties in the identity management network.

9 Claims, 10 Drawing Sheets

U.S. PATENT DOCUMENTS

| | | |
|---|---|---|
| 5,903,721 A | 5/1999 | Sixtus |
| 5,911,141 A | 6/1999 | Kelley et al. |
| 5,930,479 A | 7/1999 | Hall |
| 5,953,710 A | 9/1999 | Fleming |
| 5,983,208 A | 11/1999 | Haller et al. |
| 6,005,939 A | 12/1999 | Fortenberry et al. |
| 6,012,044 A | 1/2000 | Maggioncalda et al. |
| 6,029,141 A | 2/2000 | Bezos et al. |
| 6,052,710 A | 4/2000 | Saliba et al. |
| 6,061,790 A | 5/2000 | Bodnar |
| 6,073,106 A | 6/2000 | Rozen et al. |
| 6,073,241 A | 6/2000 | Rosenberg et al. |
| 6,092,196 A | 7/2000 | Reiche |
| 6,125,352 A | 9/2000 | Franklin et al. |
| 6,154,768 A | 11/2000 | Chen et al. |
| 6,192,380 B1 | 2/2001 | Light et al. |
| 6,199,079 B1 | 3/2001 | Gupta et al. |
| 6,208,659 B1 | 3/2001 | Govindarajan et al. |
| 6,233,608 B1 | 5/2001 | Laursen et al. |
| 6,243,688 B1 | 6/2001 | Kalina |
| 6,247,029 B1 | 6/2001 | Kelley et al. |
| 6,253,203 B1 | 6/2001 | O'Flaherty et al. |
| 6,266,692 B1 | 7/2001 | Greenstein |
| 6,285,983 B1 | 9/2001 | Jenkins |
| 6,289,333 B1 | 9/2001 | Jawahar et al. |
| 6,298,347 B1 | 10/2001 | Wesley |
| 6,308,203 B1 | 10/2001 | Itabashi et al. |
| 6,321,339 B1 | 11/2001 | French et al. |
| 6,327,578 B1 | 12/2001 | Linehan |
| 6,353,852 B1 | 3/2002 | Nestoriak et al. |
| 6,356,905 B1 | 3/2002 | Gershman et al. |
| 6,381,597 B1 | 4/2002 | Lin |
| 6,385,596 B1 | 5/2002 | Wiser et al. |
| 6,401,085 B1 | 6/2002 | Gershman et al. |
| 6,421,768 B1 | 7/2002 | Purpura |
| 6,491,217 B2 | 12/2002 | Catan |
| 6,496,855 B1 | 12/2002 | Hunt et al. |
| 6,571,279 B1 | 5/2003 | Herz et al. |
| 6,571,285 B1 | 5/2003 | Groath et al. |
| 6,584,448 B1 | 6/2003 | Laor |
| 6,605,224 B2 | 8/2003 | Aymong |
| 6,609,198 B1 | 8/2003 | Wood et al. |
| 6,629,081 B1 | 9/2003 | Cornelius et al. |
| 6,651,090 B1 | 11/2003 | Itabashi et al. |
| 6,665,704 B1 | 12/2003 | Singh |
| 6,668,322 B1 | 12/2003 | Wood et al. |
| 6,708,205 B2 | 3/2004 | Sheldon et al. |
| 6,714,916 B1 | 3/2004 | Robertson et al. |
| 6,725,050 B1 | 4/2004 | Cook |
| 6,845,370 B2 | 1/2005 | Burkey et al. |
| 6,907,401 B1 | 6/2005 | Vittal et al. |
| 6,944,677 B1 | 9/2005 | Zhao |
| 6,957,334 B1 | 10/2005 | Goldstein et al. |
| 7,016,875 B1 | 3/2006 | Steele et al. |
| 7,016,877 B1 | 3/2006 | Steele et al. |
| 7,054,906 B2 | 5/2006 | Levosky |
| 7,076,558 B1 | 7/2006 | Dunn |
| 7,089,208 B1 | 8/2006 | Levchin et al. |
| 7,100,195 B1 | 8/2006 | Underwood |
| 7,197,539 B1 | 3/2007 | Cooley |
| 7,216,292 B1 | 5/2007 | Snapper et al. |
| 7,257,581 B1 | 8/2007 | Steele et al. |
| 7,289,971 B1 | 10/2007 | O'Neil et al. |
| 7,343,351 B1 | 3/2008 | Bishop et al. |
| 7,380,271 B2 | 5/2008 | Moran et al. |
| 7,454,623 B2 | 11/2008 | Hardt |
| 7,467,141 B1 | 12/2008 | Steele et al. |
| 7,487,130 B2 | 2/2009 | Steele et al. |
| 7,546,349 B1 | 6/2009 | Cooley |
| 7,610,391 B2 | 10/2009 | Dunn |
| 7,783,741 B2 | 8/2010 | Hardt |
| 7,793,095 B2 | 9/2010 | Hardt |
| 2001/0011250 A1 | 8/2001 | Paltenghe et al. |
| 2001/0018660 A1 | 8/2001 | Sehr |
| 2001/0047276 A1 | 11/2001 | Eisenhart |
| 2002/0002684 A1 | 1/2002 | Fox et al. |
| 2002/0016721 A1 | 2/2002 | Mason et al. |
| 2002/0062262 A1 | 5/2002 | Vasconi et al. |
| 2002/0087641 A1 | 7/2002 | Levosky |
| 2002/0091745 A1 | 7/2002 | Ramamurthy et al. |
| 2002/0091798 A1 | 7/2002 | Joshi et al. |
| 2002/0099671 A1 | 7/2002 | Mastin Crosbie et al. |
| 2002/0107807 A1 | 8/2002 | Ketonen et al. |
| 2002/0107972 A1 | 8/2002 | Keane |
| 2002/0112083 A1 | 8/2002 | Joshi et al. |
| 2002/0112155 A1 | 8/2002 | Martherus et al. |
| 2002/0112185 A1 | 8/2002 | Hodges |
| 2002/0116642 A1 | 8/2002 | Joshi et al. |
| 2002/0120599 A1 | 8/2002 | Knouse et al. |
| 2002/0138581 A1 | 9/2002 | MacIntosh et al. |
| 2002/0152179 A1 | 10/2002 | Racov |
| 2002/0154157 A1 | 10/2002 | Sherr et al. |
| 2002/0165960 A1 | 11/2002 | Chan |
| 2002/0174369 A1 | 11/2002 | Miyazaki et al. |
| 2002/0178365 A1 | 11/2002 | Yamaguchi |
| 2002/0194138 A1 | 12/2002 | Dominguez et al. |
| 2002/0198818 A1 | 12/2002 | Scott et al. |
| 2002/0199095 A1 | 12/2002 | Bandini et al. |
| 2003/0074580 A1 | 4/2003 | Knouse et al. |
| 2003/0110397 A1 | 6/2003 | Supramaniam et al. |
| 2003/0130960 A1 | 7/2003 | Fraser et al. |
| 2003/0131232 A1 | 7/2003 | Fraser et al. |
| 2003/0135732 A1 | 7/2003 | Vaha-Sipila |
| 2003/0149781 A1 | 8/2003 | Yared et al. |
| 2003/0158960 A1 | 8/2003 | Engberg |
| 2003/0204725 A1 | 10/2003 | Itoi et al. |
| 2003/0208684 A1 | 11/2003 | Camacho et al. |
| 2003/0225841 A1 | 12/2003 | Song et al. |
| 2003/0229783 A1 | 12/2003 | Hardt |
| 2004/0008666 A1 | 1/2004 | Hardjono |
| 2004/0010697 A1 | 1/2004 | White |
| 2004/0049677 A1 | 3/2004 | Lee et al. |
| 2004/0103324 A1 | 5/2004 | Band |
| 2004/0128558 A1 | 7/2004 | Barrett |
| 2004/0143750 A1 | 7/2004 | Kulack et al. |
| 2004/0162786 A1 | 8/2004 | Cross et al. |
| 2004/0177110 A1 | 9/2004 | Rounthwaite et al. |
| 2004/0181665 A1 | 9/2004 | Houser |
| 2004/0205243 A1 | 10/2004 | Hurvig et al. |
| 2004/0243823 A1 | 12/2004 | Moyer et al. |
| 2004/0255117 A1 | 12/2004 | Paatero et al. |
| 2005/0005110 A1 | 1/2005 | Kim et al. |
| 2005/0114453 A1 | 5/2005 | Hardt |
| 2005/0171811 A1 | 8/2005 | Campbell et al. |
| 2005/0210107 A1 | 9/2005 | Mora |
| 2005/0210244 A1 | 9/2005 | Stevens et al. |
| 2005/0283443 A1 | 12/2005 | Hardt |
| 2005/0283614 A1 | 12/2005 | Hardt |
| 2006/0005019 A1 | 1/2006 | Chao |
| 2006/0005020 A1 | 1/2006 | Hardt |
| 2006/0005263 A1 | 1/2006 | Hardt |
| 2006/0106734 A1 | 5/2006 | Hoffman et al. |
| 2006/0179003 A1 | 8/2006 | Steele et al. |
| 2006/0200425 A1 | 9/2006 | Steele et al. |
| 2006/0229944 A1 | 10/2006 | Walker et al. |
| 2007/0143860 A1 | 6/2007 | Hardt |
| 2007/0277034 A1 | 11/2007 | LiVecchi |
| 2007/0282733 A1 | 12/2007 | May |
| 2008/0010298 A1 | 1/2008 | Steele et al. |
| 2009/0125429 A1 | 5/2009 | Takayama |
| 2009/0157531 A1 | 6/2009 | Bui |
| 2009/0210293 A1 | 8/2009 | Steele et al. |

FOREIGN PATENT DOCUMENTS

| | | |
|---|---|---|
| CA | 2222480 A1 | 7/1998 |
| CA | 2245293 A1 | 9/1999 |
| CA | 2458257 A1 | 9/2003 |
| CA | 2447121 A1 | 1/2004 |
| CA | 2431311 A1 | 5/2004 |
| CA | 2468351 A1 | 8/2004 |
| CA | 2468585 A1 | 8/2004 |
| CA | 2493897 A1 | 4/2005 |
| CA | 2494225 A1 | 4/2005 |
| CN | 1289974 | 4/2001 |
| EP | 1089516 | 4/2001 |
| EP | 1089516 A2 | 4/2001 |
| EP | 1089518 A2 | 4/2001 |

| | | | |
|---|---|---|---|
| EP | 1223527 A2 | 7/2002 |
| EP | 1316016 A2 | 6/2003 |
| EP | 1316028 A1 | 6/2003 |
| EP | 1316041 A1 | 6/2003 |
| EP | 1388986 A1 | 2/2004 |
| EP | 1520217 A2 | 4/2005 |
| EP | 1766840 A1 | 3/2007 |
| EP | 1766852 A1 | 3/2007 |
| EP | 1766853 A1 | 3/2007 |
| EP | 1766863 A1 | 3/2007 |
| FR | 1098155 A | 7/1955 |
| JP | 11282804 | 10/1999 |
| JP | 2001186122 | 7/2001 |
| JP | 2003071960 A | 3/2003 |
| JP | 2003323408 A | 11/2003 |
| JP | 2005529392 T | 9/2005 |
| WO | WO-0067415 | 11/2000 |
| WO | WO-0146783 A2 | 6/2001 |
| WO | WO-0167364 | 9/2001 |
| WO | WO-0205092 A2 | 1/2002 |
| WO | WO-0205103 A1 | 1/2002 |
| WO | WO-0205139 A1 | 1/2002 |
| WO | WO-0205185 A1 | 1/2002 |
| WO | WO-0205487 A1 | 1/2002 |
| WO | WO-03046748 A1 | 6/2003 |
| WO | WO-03098898 A1 | 11/2003 |
| WO | WO-2003104947 | 12/2003 |
| WO | WO-2005048544 A1 | 5/2005 |
| WO | WO-2005125077 A1 | 12/2005 |
| WO | WO-2005125086 A1 | 12/2005 |
| WO | WO-2005125087 A1 | 12/2005 |
| WO | WO-2005125096 A1 | 12/2005 |
| ZM | 200500060 | 3/2006 |

OTHER PUBLICATIONS

Lopez, D. R., et al., "Ubiquitous internet access control: the PAPI system", *Proc. of the 13th International Workshop on Database and Expert Sytems Applications* (DEXA'02), XP010612047, (Sep. 2002), pp. 368-372.
Chu, S. et al., "Web-Based Single Sign-On Solutions: An SSO Product Matrix", *Computer Security Journal*, CSI Computer Security Institute, XX, vol. 16 No. 1, XP008021056, ISSN: 0277-0865, (2000), pp. 39-49.
Asaravala, A. "A Question of Identity Passport, Liberty and the Single Sign-On Race", www.newarchitectmag.com, XP002264221,(Jan. 31, 2003), pp. 22-24.
Erdos, Marlena et al., "Shibboleth—Architecture DRAFT v05 Online", Retrieved from: <http://shibboleth.internet2.edu/docs/draft-internet2-shibboleth-arch-v05.pdf> on Dec. 8, 2003, pp. 5-9, (May 5, 2002), 44 pages.
"Non Final Office Action", U.S. Appl. No. 10/455,438, (Jan. 10, 2007), 11 pages.
"Final Office Action", U.S. Appl. No. 10/455,438, (Jun. 26, 2007), 10 pages.
"Non-Final Office Action", U.S. Appl. No. 10/455,438, (Feb. 5, 2008), 1.
"Final Office Action", U.S. Appl. No. 10/455,438, (Oct. 30, 2008), 14 pages.
"Foreign Office Action", Application Serial No. 2004-511955, (Jul. 7, 2009), 15 pages.
Kormann, David P., et al., "Risks of the Passport Single Signon Protocol", *IEEE Computer Networks*, Jul. 2000, 12 pages.
"Final Office Action", U.S. Appl. No. 10/455,438, (Dec. 2, 2009), 8 pages.
"Advisory Action", U.S. Appl. No. 10/455,438, (Feb. 19, 2010), 3 pages.
"Notice of Allowance", U.S. Appl. No. 10/455,438, (Apr. 30, 2010), 10 pages.
Non-Final Office Action for U.S. Appl. No. 11/039,885; Mailed on Aug. 26, 2011; 36 pages.
U.S. Appl. No. 09/988,811, filed Nov. 20, 2001, Steele et al.
"724 Solutions-Products-Financial Services," www.724.com, Sep. 25, 2001, 1 page.
"724 Solutions-Products-m-Commerce," www.724.com, Sep. 25, 2001, pp. 1-4.
"724 Solutions-Products-Wireless Internet Platform," www.724.com, Sep. 25, 2001, pp. 1-3.
Affiliate Application," How do Gator, Price Helper and Offer Companion Work?" www.gator.com, Sep. 6, 2001, 1 page.
"Choicepoint Unveils New Web-based Pre-Employment Screening Service," Business Wire p. 1287, May 17, 1999.
"Co-Brand Partner Opportunities," www.yodlee.com, Sep. 6, 2001, pp. 1-2.
"Content Partner Opportunities," www.yodlee.com, Sep. 6, 2001, 1 page.
"Create Relationships," www.digitalme.com, Sep. 6, 2001, pp. 1-2.
"Digitaline™ Fact Sheet (www.digitalme.com)" www.digitalme.com, Sep. 6, 2001, pp. 1-3.
"Ezlogin.Com Introduces Liveclips, Enabling Net Users To Clip Content From Anywhere On The Web And Paste It On A Custom Page," Java Industry Connection, Mar. 8, 2000, pp. 1-2.
"FAQ", www.digitalme.com, Sep. 6, 2001, pp. 1-2.
"Free Password Manager—Store passwords—Desktop or Online," www.passwordsafe.com, Oct. 10, 2001, 1 page.
"Implementing Mobile Passport," Copyright 1999-2001 Microsoft Corporation, Oct. 26, 2001, pp. 1-5.
"Learn More," www.digitalme.com, Sep. 6, 2001, pp. 1-2.
"Liberty Architecture Overview," Version 1.1, Internet Citation, Jan. 15, 2003, pp. 1-44.
"LinkUall.com—About Us—LinkUall Technology" www.linkuall.com, Copyright 1999-2000 Sinpag Inc., 1 page.
"LinkUall.com—Products—Calendars and Address books," www.linkuall.com, Oct. 10, 2001, pp. 1-2.
"Make it Convenient," www.digitalme.com, Sep. 6, 2001, pp. 1-3.
"Microsoft Passport Member Services. What is Passport," www.passport.com, Aug. 3, 2001, pp. 1-12.
"Microsoft Passport: A single name, password and Wallet for the web," WWW.passport.com, Aug. 3, 2001, pp. 1-2.
"Microsoft Passport: Streamlining Commerce and Communication on the Web," www.passport.com, Oct. 11, 1999, pp. 1-3.
"Online Businesses Use Microsoft Passport Single Sign-In and Wallet Services to Provide Customers with Secure and Convenient Shopping," www.microsoft.com, May 17, 2000, pp. 1-2.
"Security Overview," www.yodlee.com, Sep. 6, 2001, pp. 1-2.
"Spam—me—not Documentations," Web Archive Dated Oct. 11, 2003, 5 pages.
"Spamgourmet: FAQ," by Spamgourmet.com, Web Archive dated Aug. 29, 2003, 3 pages.
"Spoofed/Forged Email," 2002 Carnegie Mellon University, pp. 1-7.
"Sweet Enonymity," www.enonymous.com, Sep. 6, 2001, pp. 1-2.
"Take Control," www.digitalme.com, Sep. 6, 2001, pp. 1-2.
"Vision For An Enonymous Infomediary," www.enonymous.com, Sep. 6, 2001, pp. 1-3.
"Yodlee2Go: Web-enabled Phones", www.yodlee.com, Sep. 6, 2001, 1 page.
"Yodlee for Mobile: Simplify Your Life on the Road with Yodlee2Go," www.yodlee.com, Sep. 6, 2001, 1 page.
"Yodlee for Web: One-Click Access to All Personal Accounts," www.yodlee.com, Sep. 6, 2001, 1 page.
"Yodlee2Go: Palm OS Wireless," www.yodlee.com, Sep. 6, 2001, 1 page.
"Yodlee: e-Personalization Applications," www.yodlee.com, Sep. 6, 2001, 1 page.
"Yodlee: e-Personalization Platform," www.yodlee.com, Sep. 6, 2001, 1 page.
"Yodlee: e-Personalization Solutions," www.yodlee.com, Sep. 6, 2001, 1 page.
"Zkey-Corporate," www.zkey.com, Oct. 10, 2001, 1 page.
Advisory Action before the Filing of an Appeal Brief for U.S. Appl. No. 09/988,811, Mailed on Apr. 20, 2009, 3 pages.
Advisory Action for U.S. Appl. No. 09/933,567, Mailed on Jul. 21, 2006, 3 pages.
Advisory Action for U.S. Appl. No. 10/867,768, Mailed on Sep. 17, 2009, 3 pages.
Advisory Action for U.S. Appl. No. 11/039,885, Mailed on Feb. 24, 2010, 4 pages.
Advisory Action for U.S. Appl. No. 11/039,886, Mailed on Sep. 17, 2010, 3 pages.

Advisory Action for U.S. Appl. No. 11/327,176, Mailed on Mar. 25, 2011, 2 pages.
Advisory Action for U.S. Appl. No. 11/824,358, Mailed on Aug. 24, 2010, 3 pages.
Alan Cohen and Walaika Haskins, "Grab and-Go Web," PC Magazine, Oct. 19, 2000, pp. 1-5.
Bennett, "NGWS—Microsoft's Dot Net Strategy," PC_Buyer's_Guide.com., Jun. 22, 2000, pp. 1-5.
Coulouris, "Secure Communication in Non-Uniform Trust Environment," ECOOP Workshop on Distributed Object Security, Jul. 1998, 5 pages.
Final Office Action for U.S. Appl. No. 09/933,567, Mailed on Nov. 1, 2007, 13 pages.
Final Office Action for U.S. Appl. No. 09/933,567, Mailed on May 11, 2006, 9 pages.
Final Office Action for U.S. Appl. No. 09/988,811, Mailed on Jan. 27, 2010, 8 pages.
Final Office Action for U.S. Appl. No. 09/988,811, Mailed on Dec. 30, 2010, 10 pages.
Final Office Action for U.S. Appl. No. 09/988,811, Mailed on Feb. 2, 2009, 9 pages.
Final Office Action for U.S. Appl. No. 10/713,100, Mailed on Oct. 28, 2008, 9 pages.
Final Office Action for U.S. Appl. No. 10/713,100, Mailed on Oct. 30, 2009, 11 pages.
Final Office Action for U.S. Appl. No. 10/713,100, Mailed on Jun. 14, 2007, 14 pages.
Final Office Action for U.S. Appl. No. 10/867,768, Mailed on May 28, 2009, 7 pages.
Final Office Action for U.S. Appl. No. 10/867,768, Mailed on Jun. 1, 2006, 8 pages.
Final Office Action for U.S. Appl. No. 10/867,768, Mailed on Jun. 25, 2010, 8 pages.
Final Office Action for U.S. Appl. No. 10/867,768, Mailed on Jul. 28, 2005, 7 pages.
Final Office Action for U.S. Appl. No. 10/867,768, Mailed on Jul. 5, 2007, 10 pages.
Final Office Action for U.S. Appl. No. 11/039,885, Mailed on Nov. 29, 2010, 19 pages.
Final Office Action for U.S. Appl. No. 11/039,885, Mailed on Dec. 16, 2009, 14 pages.
Final Office Action for U.S. Appl. No. 11/039,885, Mailed on Mar. 18, 2009, 12 pages.
Non Final Office Action for U.S. Appl. No. 11/039,885, Mailed on Sep. 10, 2009, 14 pages.
Final Office Action for U.S. Appl. No. 11/039,886, Mailed on Mar. 5, 2009, 16 pages.
Final Office Action for U.S. Appl. No. 11/039,886, Mailed on Jul. 9, 2010, 20 pages.
Final Office Action for U.S. Appl. No. 11/327,160, Mailed on Feb. 23, 2007, 10 pages.
Final Office Action for U.S. Appl. No. 11/327,160, Mailed on Mar. 25, 2008, 11 pages.
Final Office Action for U.S. Appl. No. 11/327,176, Mailed on Dec. 22, 2010, 11 pages.
Final Office Action for U.S. Appl. No. 11/327,176, Mailed on Dec. 9, 2009, 11 pages.
Final Office Action for U.S. Appl. No. 11/824,358, Mailed on Jun. 29, 2010, 15 pages.
Gabber et al., "Curbing June E-Mail via Secure Classification," FC-98: Proceedings of the Second International Conference on Financial Cryptography, 1998, pp. 198-213.
Gator Press Release "Gator Helps Consumers at More Than 25,000 E-Commerce and Registration Sites in First Month of Usage: Software an invaluable companion For more than 80,000 online consumers," Aug. 3, 1999, pp. 1-2.
Gator Press Release "Gator.Com Delivers on the Promise of the Electronic Commerce Modeling Language (ECML) Standard Today: Gator offers one click shopping at over 5,000 e-commerce sites today," Jun. 14, 1999, pp. 1-2.
Gator Press Release "Internet Start-up Gator.com Introduces Gator, the Web's First Smart Online Companion: New Internet product offers one-click login and express registration and checkout across the web," Jun. 14, 1999, pp. 1-3.
Gburzynski, "A Comprehensive Approach to Eliminating Spam," Proceedings of Euromedia, Plymouth, UK, Apr. 2003, 5 pages.
Gunnerson, "EZ Login," PC Magazine, Mar. 14, 2000, pp. 1-2.
Hall, "How to Avoid Unwanted Email," Communications of the Association for Computing Machinery, vol. 41, No. 3, Mar. 1, 1998, pp. 88-95.
Hallam-Baker, "Security Assertions Markup Language: Core Assertion Architecture—Examples and Explanations," Internet Citation, http://www.oasis-open.org/committees/security/docs/draft-sstc-core-phill-07.pdf, May 14, 2001, 24 pages.
International Search Report for PCT/CA2003/000857; Applicant: Hardt, Dick, C., Filed on Jun. 6, 2003, Mailed on Dec. 22, 2003, 7 pages.
International Search Report for PCT/CA2003/01774, Applicant: Sxip Networks Srl, Filed on Nov. 17, 2003, Mailed on Jul. 13, 2004, 3 pages.
International Search Report for PCT/CA2005/000934; Applicant: Sxip Networks Srl, Filed on Jun. 16, 2005, Mailed on Sep. 28, 2005, 4 pages.
International Search Report for PCT/CA2005/000935, Applicant: Sxip Networks Srl, Filed on Jun. 16, 2005, Mailed on Oct. 4, 2005, 3 pages.
International Search Report for PCT/CA2005/000937, Applicant: Sxip Networks Srl, Filed on Jun. 16, 2005, Mailed on Oct. 6, 2005, 3 pages.
International Search Report for PCT/CA2005/000936; Applicant: Sxip Networks Srl, Filed on Jun. 16, 2005, Mailed on Sep. 20, 2005, 3 pages.
Interview Summary for U.S. Appl. No. 09/923,285, Mailed on Apr. 12, 2007, 2 pages.
Interview Summary for U.S. Appl. No. 09/933,567, Mailed on Aug. 16, 2006, 4 pages.
Interview Summary for U.S. Appl. No. 09/988,811, Mailed on Oct. 8, 2010, 3 pages.
Interview Summary for U.S. Appl. No. 09/988,811, Mailed on Mar. 15, 2010, 3 pages.
Interview Summary for U.S. Appl. No. 09/988,811, Mailed on Sep. 18, 2009, 2 pages.
Interview Summary for U.S. Appl. No. 10/455,438, Mailed on Apr. 14, 2010, 3 pages.
Interview Summary for U.S. Appl. No. 11/039,885, Mailed on Oct. 13, 2009, 3 pages.
Interview Summary for U.S. Appl. No. 11/039,885, Mailed on Jun. 22, 2009, 2 pages.
Interview Summary for U.S. Appl. No. 11/039,885, Mailed on Sep. 1, 2010, 3 pages.
Interview Summary for U.S. Appl. No. 11/824,358, Mailed on Aug. 6, 2010, 3 pages.
Marchiori, "Platform for Privacy Preference (P3P) Syntex Specification," Internet Citation, http://classic-web.archive.org/web/20031207022324/www.w3.org/tr/1999/wd-p3p-19990826/syntax, Aug. 26, 1999, pp. 1-25.
Menezes et al., "Handbook of Applied Cryptography," Chapter 12, Section 12.5.2, pp. 509-512, 1997.
Microsoft Press Release. "Microsoft Passport Offers Streamlined Purchasing Across Leading Web Sites," Oct. 11, 1999, pp. 1-4.
Microsoft PressPass, Microsoft.NET: "A Platform for the Next Generation Internet," Jun. 22, 2000, pp. 1-7.
Microsoft.NET Passport Technical Overview, Sep. 2001, 29 pages.
Microsoft.NET Passport, "What's New," Sep. 2001, 14 pages.
Non Final Office Action and Interview Summary for U.S. Appl. No. 09/933,567, Mailed on Feb. 20, 2007, 16 pages.
Non Final Office Action for U.S. Appl. No. 09/923,285, Mailed on Jul. 12, 2004, 11 pages.
Non Final Office Action for U.S. Appl. No. 09/933,567, Mailed on Sep. 29, 2005, 9 pages.
Non Final Office Action for U.S. Appl. No. 09/974,766, Mailed on Feb. 4, 2005, 14 pages.

Non Final Office Action for U.S. Appl. No. 09/988,811, Mailed on Jan. 23, 2006, 12 pages.
Non Final Office Action for U.S. Appl. No. 09/988,811, Mailed on Dec. 5, 2007, 7 pages.
Non Final Office Action for U.S. Appl. No. 09/988,811, Mailed on Jul. 11, 2005, 5 pages.
Non Final Office Action for U.S. Appl. No. 09/988,811, Mailed on Jul. 14, 2009, 9 pages.
Non Final Office Action for U.S. Appl. No. 09/988,811, Mailed on Aug. 18, 2010, 8 pages.
Non Final Office Action for U.S. Appl. No. 10/713,100, Mailed on Feb. 27, 2009, 8 pages.
Non Final Office Action for U.S. Appl. No. 10/713,100, Mailed on Dec. 5, 2006, 15 pages.
Non Final Office Action for U.S. Appl. No. 10/713,100, Mailed on Mar. 26, 2008, 8 pages.
Non Final Office Action for U.S. Appl. No. 10/867,635, Mailed on Nov. 21, 2007, 5 pages.
Non Final Office Action for U.S. Appl. No. 10/867,768, Mailed on Oct. 31, 2008, 7 pages.
Non Final Office Action for U.S. Appl. No. 10/867,768, Mailed on Dec. 15, 2006, 7 pages.
Non Final Office Action for U.S. Appl. No. 10/867,768, Mailed on Dec. 19, 2005, 8 pages.
Non Final Office Action for U.S. Appl. No. 10/867,768, Mailed on Dec. 30, 2009, 8 pages.
Non Final Office Action for U.S. Appl. No. 10/867,768, Mailed on Mar. 24, 2008, 6 pages.
Non Final Office Action for U.S. Appl. No. 10/867,768, Mailed on Mar. 30, 2005, 8 pages.
Non Final Office Action for U.S. Appl. No. 11/039,885, Mailed on Jun. 17, 2008, 11 pages.
Non Final Office Action for U.S. Appl. No. 11/039,885, Mailed on Jun. 3, 2010, 17 pages.
Non Final Office Action for U.S. Appl. No. 11/039,886, Mailed on Feb. 9, 2009, 20 pages.
Non Final Office Action for U.S. Appl. No. 11/039,886, Mailed on Jun. 24, 2008, 14 pages.
Non Final Office Action for U.S. Appl. No. 11/327,160, Mailed on Oct. 4, 2007, 9 pages.
Non Final Office Action for U.S. Appl. No. 11/327,160, Mailed on Jul. 12, 2006, 12 pages.
Non Final Office Action for U.S. Appl. No. 11/327,176, Mailed on May 28, 2009, 12 pages.
Non Final Office Action for U.S. Appl. No. 11/327,176, Mailed on Jun. 9, 2010, 12 pages.
Non Final Office Action for U.S. Appl. No. 11/824,358, Mailed on Jan. 29, 2010, 13 pages.
Non Final Office Action for U.S. Appl. No. 11/824,358, Mailed on Oct. 8, 2010, 12 pages.
Non Final Office Action for U.S. Appl. No. 11/824,358, Mailed on Mar. 18, 2011, 8 pages.
Non Final Office Action U.S. Appl. No. 10/007,785, Mailed on Mar. 2, 2005, 26 pages.
Notice of Allowance and Interview Summary for U.S. Appl. No. 09/974,766, Mailed on Nov. 22, 2005, 10 pages.
Notice of Allowance and Interview Summary for U.S. Appl. No. 10/713,100, Mailed on Apr. 16, 2010, 12 pages.
Notice of Allowance for U.S. Appl. No. 09/923,285, Mailed on Apr. 12, 2007, 13 pages.
Notice of Allowance for U.S. Appl. No. 09/933,567, Mailed on Aug. 11, 2008, 9 pages.
Notice of Allowance for U.S. Appl. No. 10/007,785, Mailed on Nov. 22, 2005, 10 pages.
Notice of Allowance for U.S. Appl. No. 10/007,785, Mailed on Feb. 10, 2006, 3 pages.
Notice of Allowance for U.S. Appl. No. 10/867,635, Mailed on Jun. 20, 2008, 4 pages.
Notice of Allowance for U.S. Appl. No. 11/327,160, Mailed on Sep. 10, 2008, 12 pages.
Non Final Office Action for U.S. Appl. No. 09/988,811, Mailed on Aug. 11, 2006, 4 pages.
Rauschenberger, Secure Your Web Site With Passport, "Simplify Your Web Site Visitors' Experience By Authenticating Them," Visual Studio Magazine, Apr. 4, 2002, pp. 1-3.
Restriction Requirement for U.S. Appl. No. 09/933,567, Mailed on Jun. 17, 2005, 5 pages.
Restriction Requirement for U.S. Appl. No. 09/988,811, Mailed on Mar. 7, 2007, 4 pages.
Restriction Requirement for U.S. Appl. No. 11/039,886, Mailed on Sep. 14, 2009, 4 pages.
Restriction Requirement for U.S. Appl. No. 11/327,176, Mailed on Feb. 17, 2009, 6 pages.
Restriction Requirement for U.S. Appl. No. 11/327,176, Mailed on Mar. 20, 2008, 6 pages.
Restriction Requirement for U.S. Appl. No. 11/327,176, Mailed on Jul. 9, 2008, 7 pages.
Restriction Requirement for U.S. Appl. No. 11/824,358, Mailed on Aug. 3, 2009, 7 pages.
Secure Your Web Site With Passport, "Implement Passport," Visual Studio Magazine, Apr. 4, 2002, pp. 1-3.
Secure Your Web Site With Passport, "Passport Key to HailStrom's Success," Visual Studio Magazine, Apr. 4, 2002, pp. 1-2.
Secure Your Web Site With Passport, "Sign In, Please," Visual Studio Magazine, Apr. 4, 2002, pp. 1-3.
Supplemental Advisory Action for U.S. Appl. No. 11/039,885, Mailed on Apr. 1, 2010, 3 pages.
Supplementary European Search Report for PCT/CA2005/000934, Applicant: Sxip Networks Srl, Filed on Jun. 16, 2005, Mailed on May 27, 2011, 3 pages.
Supplementary European Search Report for PCT/CA2005/000935, Applicant: Sxip Networks Srl, Filed on Jun. 16, 2005; Mailed on Apr. 4, 2011, 3 pages.
Supplementary European Search Report for PCT/CA2005/000936, Applicant: Sxip Networks Srl, Filed on Jun. 16, 2005, Mailed on Jul. 19, 2010, 3 pages.
Non Final Office Action for U.S. Appl. No. 11/039,886, Mailed on Jun. 8, 2011, 33 pages.
Non-Final Office Action for Patent Application No. 09/988,811; Mailed Oct. 14, 2011; 34 pgs.
Final Office Action for U.S. Appl. No. 11/039,886; Mailed on Nov. 8, 2011; 56 pages.
Restriction Requirement for U.S. Appl. No. 12/434,803; Mailed on Nov. 14, 2011; 7 pages.
Final Office Action for U.S. Appl. No. 11/824,358; Mailed on Nov. 15, 2011; 35 pages.

DISTRIBUTED HIERARCHICAL IDENTITY MANAGEMENT

CROSS REFERENCE TO RELATED APPLICATIONS

This application is a Divisional of and claims priority to U.S. Non-Provisional patent application Ser. No. 10/455,438, filed Jun. 6, 2003 which claims the benefit of and priority to U.S. Provisional Application Ser. No. 60/386,256 filed on Jun. 6, 2002, the disclosures of which are incorporated herein by reference as if set forth in their entirety for all purposes.

FIELD OF THE INVENTION

The present invention relates generally to a method and system for identity management. More particularly, the present invention relates to a distributed hierarchical identity management system and method if its use in distributed computer networks.

BACKGROUND OF THE INVENTION

In the field of electronic commerce there is an acknowledged need for a system and method to either manage or authenticate identity based information. It is acknowledged among those skilled in the art that the authentication of identity based information is not related to guaranteeing that a user is who he or she says. Instead, authentication of identity is restricted to authenticating that a user has presented the same credentials that were previously presented when an identity was asserted. A simple way to understand this subtle difference is to examine a situation where a user is identified by a user identification (user ID) to which there is an associated password. An electronic system has no way of determining who the user is when an account is initialized. However, after the account is initialized the presentation of the user ID and password in combination can be taken as proof that this is the same person who had previously registered for a service and provided these credentials. The presentation of a user ID and password does not prove that the user is a particular individual.

Identity management is of great concern in the electronic commerce field because it allows an electronic vendor or service provider to provide a user with customized services and further allows the vendor to track user behaviour. From the user perspective, identity management permits a user to retrieve previously stored identifying information. In the absence of any identity management system each individual use of a service would be accompanied by selecting a series of settings that could not be maintained in the following session. For example, in the case of an on-line purchase the lack of an identity management system would entail requiring a user to provide all identifying information, including credit card numbers, billing and shipping addresses for each and every purchase. This is commonly regarded as a nuisance to consumers, and serves as a detriment to on-line commerce.

One skilled in the art will appreciate that though the following discussion generally relates to electronic commerce applications of identity management, a number of other non commerce related services, such as customisation of a news site, registration for access to a newspaper, and maintenance of a desired display configuration for an electronic discussion site, all make use of identity management. For these services the ability of a user to have a single-sign on for multiple services is a high priority.

FIG. 1 illustrates a first generation identity management system. A user 100 connects over internet 102 to an electronic retailer 104, commonly referred to as an E-tailer. E-tailer 104 is typically accessed using a hypertext transfer protocol (HTTP) session. Upon an initial visit to a site hosted by E-tailer 104, user 100 creates a user profile including a user ID and password. The user ID and password, along with other associated information, potentially including credit card information, shipping and billing addresses, and display preferences, are stored in user profile database 106. Preferably, user profile database 106 is inaccessible to general computers connected to internet 102 to protect the confidential user information. After creating a user profile in user profile database 106, user 100 can simplify further visits to E-tailer 104 by simply presenting a credential to certify his or her identity. Typically, this credential is a combination of the user ID and password. Upon being presented with this credential, E-tailer 104 can perform a look-up in the user profile database 106 to confirm that user 100 has presented a valid identity credential. Upon successful completion of this check, user 100 will not be prompted to provide already known information. From the perspective of E-tailer 104, this system ensures that user 100 has provided all information required for transactions, which can then be stored in the user profile database 106. This information can be correlated across a number of sessions or transactions to create user profile trends. From the perspective of a user, this system permits simplified dealings with E-tailer 104. However, a drawback to this system is illustrated in FIG. 2.

FIG. 2 illustrates the network model of user 100 connecting, using internet 102, to two different E-tailers, E-tailer 104a and E-tailer 104b. Each E-tailer has its own user profile database: databases 106a and 106b, respectively. Because the user ID and password is used to authenticate the identity of user 100, E-tailers typically insists that each user ID be unique. Thus, it is conceivable that user 100 may have different user IDs at E-tailer 104a and 104b, in addition to further user IDs at other E-tailers not shown. Multiple user Ids are difficult to manage from the perspective of the user. Additionally, if the user's information changes, for example if user 100 moves or changes credit card information, each user information database 106a and 106b must be independently updated. Though on a small scale this is merely troublesome, for many users who frequent a variety of E-tailers this can be a great nuisance. Additionally, repeated entry of user data increases the probability that the user will inadvertently provide incorrect information, which is a detriment to the E-tailer. Thus in combination, the responsibility of ensuring the data integrity of a number of databases, and the hassles associated with multiple user IDs render this model of identity management lacking in the eyes of many users.

To ensure a unique user ID, many E-tailers use the e-mail address of user 100 in place of a user ID. However, the e-mail address provided by the user is not guaranteed to be static over any length of time. In many cases, users are provided e-mail addresses by employers, internet service providers, or free e-mail providers. In all of these cases, it cannot be guaranteed that a user will not change an e-mail address due to a change in employment, a change in an internet service provider, or simple whim. As a result, users are required to resubscribe to E-tailers when their e-mail address changes.

To ensure that a user can use a single user ID for a plurality of services, and to provide what is commonly referred to in the art as "single sign-on", a second generation identity management and authentication solution was created. This solution is typically referred to as a hierarchical identity management system, and is typified by Microsoft's Passport™ service. An overview of this model is provided in FIG. 3.

FIG. 3 illustrates user 100 having a connection to identity provider 108 (IDP), preferably over internet 102. User 100 provides IDP 108 with a set of identity based information which is associated with a unique user ID and password combination. This information is stored in user profile database 110. When user 100 connects to an E-tailer 112 which is affiliated with IDP 108, user 100 provides E-tailer 112 with identity credentials that are transmitted to IDP 108 to authenticate user 100. Typically, the credentials provided by user 100 to IDP 108 through E-tailer 112 are a user ID and password combination. Upon authentication of user 100, IDP 108 provides E-tailer 112 with the stored identity information. Typically, the information provided by IDP 108 to E-tailer 112 is either a strictly defined subset of the information stored by IDP 108, or is the entire collection of data associated with user 100 stored by IDP 108 in user profile database 110. Because IDP 108 stores information that can be accessed by a plurality of E-tailers with whom it is affiliated IDP 108 typically does not store site specific information, such as preferences a user has expressed on a particular site, nor does IDP 108 use user preference database 110 to store a history of any items purchased by user 100 at a given E-tailer. As a result, E-tailer 112 must maintain a separate user preference database 114. The information in user preference database 114 is used to track the patterns of user 100, and to maintain a purchase, or subscription history, for user 100.

An exemplary transaction in this model entails user 100 requesting a web page from E-tailer 112 using an HTTP link over internet 102. During this HTTP session user 100 indicates that he wishes to purchase a number of items. During a check-out type procedure E-tailer 112 asks user 100 to authenticate identity. In order to receive authentication from IDP 108, E-tailer 112 requests and receives from user 100 the credentials required for authentication which are then passed to IDP 108 and authenticated. In an alternate embodiment, user 100 does not provide E-tailer 112 with authentication information. Instead, when E-tailer 112 requires authentication of identity, it redirects user 100 to IDP 108 and upon completion of this transfer user 100 provides the IDP 108 with the authentication information required. Upon successful authentication of user 100, IDP 108 redirects user 100 back to E-tailer 112. Using either the same, or a different, data communication channel, IDP 108 provides E-tailer 112 with the information stored in user profile database 110. This information is then correlated with information stored in user preference database 114 to ensure that user 100 can access historical information.

This model of identity management addresses the single sign-on problems associated with the first model of identity management, however, a number of other issues are introduced. A first problem is the trustworthiness of the entity running IDP 108. This entity must be trusted by both E-tailer 114 and user 100. IDP 108 must be trusted by user 100 to safeguard information and to provide that information only to entities approved by user 100. E-tailer 112 must trust IDP 108 to provide reliable service, accurate data, and to not act in a predatory manner. If E-tailer 114 is a service provider that offers a service competing with a service offered by the entity running IDP 108, E-tailer 114 will typically not have a high level trust in IDP 108.

As a result of many privacy concerns among users, the Microsoft Passport™ service is implemented in such a manner that a user is never required to provide E-tailer 114 with identity authentication information. Instead re-direction commands are used to pass a user from E-tailer 114 to IDP 108 over a secure connection. Over this secure connection, user 100 provides IDP 108 with identity authentication information. Upon authenticating user 100, IDP 108 redirects user 100 back to E-tailer 112 and provides E-tailer 112 with authentication and user information in a secure back channel. To ensure that two E-tailers cannot correlate the information about a single user 100 at different sites, IDP 108 provides E-tailer specific identity coding which prevents E-tailers from using the identity coding index to correlate a user between two sites. However, one skilled in the art will appreciate that E-tailer 114 typically has a credit card number associated with user 100, and thus two E-tailers sufficiently motivated to share information could correlate their databases using credit card information, email addresses, or home addresses, as a cross-referencing field.

The present embodiment of Microsoft's Passport™ system has failed to gain sufficient traction in the electronic commerce marketplace to dislodge the first generation of identity management systems. One reason for this is that a centralized user profile database such as user profile database 110 typically has a static data schema. That is it has a predefined set of information that it stores. However, different E-tailers typically request different sets of information from a user. Because a centralized user profile database 110 is not designed to store all information that a variety of E-tailers require, many E-tailers have determined that it is not worth their while to transition to a centralized user profile database 110 such as that offered by Microsoft's Passport™ service. Another reason for the inability of the Passport™ service to displace first generation identity management systems is user wariness in providing a single entity with vast amounts of identity information. In order for a user to trust an IDP sufficiently to provide this amount of information, a pre-existing trust relationship, and a user assumption of the security of the data must be present. As many users have not had a historical relationship with Microsoft of this type, many users are very reluctant to provide this information.

Another concern among many parties is that a hierarchical identity management system promotes monopolistic tendencies. To address these concerns a third generation model of identity management system has been created by the Liberty Alliance. This model can best be described as a distributed identity management system. Such a system is illustrated in FIG. 4.

FIG. 4 illustrates the distributed identity management system proposed by the Liberty Alliance. This specification describes a plurality of identity providers, here illustrated as IDP1 116, IDP2 120 and IDP3 124, having user profile databases UPD1 118 UPD2 122 and UPD3 126, respectively. All IDPs exist in a web of trust 128 where each IDP has a trust relationship with every other IDP, trust relationships are shown in dash lines. To provide data security, communication between IDPs in web of trust 128 is done using asymmetric encryption. Thus, in the example of FIG. 4, IDP1 116 has a public and private encryption key associated with it, as do IDP2 120 and IDP3 124. IDP1 116 also has the public keys of IDP2 120 and IDP3 124. Thus, all requests directed between two IDPs can be encrypted using the public key of the destination IDP and can be signed using the private key of the transmitting IDP. Thus, if IDP1 116 needs to communicate with IDP2 120, it encrypts the request to using the public key assigned to IDP2 120 and signs the encrypted message using its own private key. IDP2 120 is able to de-crypt the encrypted message using its private key, and verify the signature of IDP1 116 using the public key assigned to IDP1 116 stored in IDP2 120. This ensures that each IDP in web of trust 128 is able to communicate with every other IDP in the web of trust without fear that the data channel between IDPs has been compromised. User 100 registers with one of the IDPs in web of trust 128, as shown in FIG. 4, user 100 is associated with IDP3 124. IDP3 124 stores identity information provided by user 100, along with identity credentials in UPD3 126. When user 100 establishes a session with an E-tailer associated with any of the IDPs in web of trust 128, such as E-tailer B 132, user 100 can provide E-tailer B with identity credentials that will then be provided to one of the systems in web of trust 128. As illustrated in FIG. 4, E-tailer B 132 is affiliated with IDP2 120. Thus, ID credentials of user 100 are presented to E-tailer B 132, which relays them to IDP2 120. To authenticate user credentials of user 100, IDP2 120 determines that user 100 is affiliated with IDP3 124 and thus creates a secure data connection using public and private data keys between itself and IDP3 124. This data connection is used to authenticate the identity credentials provided by user 100. Upon authenticating user 100, IDP3 124 provides IDP2 120 with identity information which is then relayed back to E-tailer B 132.

This system provides the user 100 with a single sign-on capability and addresses the concerns related to monopolistic tendencies of an IDP. Because each IDP is independent of other IDPs, it is not considered a global storehouse of information. Thus, if an IDP security is breached only the information associated with that IDP's user profile database is comprised. This is an advantage over the hierarchical model where comprise of the user profile database exposes all users in the system.

However, according to the specification of the Liberty Alliance, only a defined set of user identity information is stored at the IDPs. Thus, E-tailers must still question user 100 about information not stored by an IDP. Additionally, public and private encryption keys require each IDP to be able to perform numerous computation intensive tasks for each data request. Additionally, a sophisticated key management system must be employed as the size of the web of trust increases. Though FIG. 4 only shows three IDPs, the model proposed in the Liberty Alliance specification is not so limited. One skilled in the art will readily appreciate that the number of IDPs in a web of trust cannot scale infinitely. Though it is possible to implement a system whereby each IDP can trust every other IDP when there is a small number of IDPs, it is unlikely that such a system can be implemented in a reliable fashion when the number of IDPs scales into the tens of thousands.

From the perspective of user 100, the model presented by the Liberty Alliance has a number of drawbacks. A user's single sign-on abilities are somewhat restricted. A user is assigned a unique user ID that identifies them to their selected IDP. When a user is authentication by an IDP in the web of trust, the E-tailer is provided a pair-wise unique identifier (PUID) that can be used in the future to identify the user. The PUIDs assigned to two E-tailers for the same user will be different to prevent cross-correlation of user purchases or activities, as the PUID is pair-wise unique. Only the IDP associated with the user holds the PUIDs provided to E-tailers, thus, migration from one IDP to another is not possible. If a user wishes to move from IDP3 124 to IDP2 120, an entirely new identity must be created, and all information stored in IDP3 124 must be re-entered by the user for storage in IDP2 120. This is viewed by many users as handcuffing them to an as yet untested system. As a result, there is great reluctance among many users to register for this service. For E-tailers and potential IDPs, participation in the Liberty Alliance includes agreeing to certain business model restrictions, including how user information must be stored and how it can be used for either statistical or marketing purposes. These restrictions are considered to be limiting the number of parties wishing to participate in the Liberty Alliance.

Both Passport™ and the Liberty Alliance provide E-tailers and other sites requiring user authentication with PUIDs. PUIDs allow the e-tailer to store information and build a profile on a user, while preventing two e-tailers from easily correlating their databases to determine user activities and patterns. PUIDs in the liberty alliance are assigned by the IDP holding the user profile, and cannot be matched to the user account by any other IDP, thus if a user chooses to change IDPs all the site specific settings at each E-tailer are lost. This handcuffs users to an IDP providing no more opportunity for portability for most users than the single source Passport™ does. Furthermore, the purpose of the PUID assigned by either Passport™ or the Liberty Alliance can be overcome as earlier discussed by correlating other information such as credit card information.

None of the present identity management systems are able to provide both a single sign-on service, specialty information required by many E-tailers, portability of identity information, and as a result none of the services has been able to supplant any of the others. It is, therefore, desirable to provide an identity management system that provides a dynamic user information set, scales and does not rely upon a global data store.

SUMMARY OF THE INVENTION

It is an object of the present invention to obviate or mitigate at least one disadvantage of previous identity management systems.

In a first aspect of the present invention, there is provided an identity management system for providing authentication of a user to a membersite. The identity management system comprises a root server having a user database for storing a globally unique identifier associated with the user. The root server has means for providing the globally unique identifier to the user, for maintaining a list of network addresses associated with names in a shadow domain for providing to a domain name server, each name associated with either the membersite or a homesite in an identity management network. The root server permits the homesite to authenticate an entity accessing the membersite as the user associated with the globally unique identifier, when the user is redirected to the name associated with the homesite in the shadow domain. The root server may optionally include homesite authenticator for providing the membersite with authentication of the authority of a homesite to authenticate the entity as the user associated with the globally unique identifier.

In an embodiment of the first aspect of the present invention, the identity management system includes a homesite, in communication with the root server and having a user profile database, a user authentication engine, and a domain name in the namespace of the shadow domain. The user profile database stores both the globally unique identifier and authentication information associated with the user. The authentication engine allows the homesite to authenticate the identity of the user. The authentication information is optionally a combination of a user ID and password. In another embodiment, the user profile database further stores identity information associated with the user, and the authentication engine includes means to provide the membersite with a subset of the identity information upon authentication of the user. In a further embodiment of the present invention, the authentication engine provides the authenticated user identity to the membersite by providing the user with a cookie containing authentication information readable by the membersite and redirecting the user to the membersite, the cookie is optionally signed by the homesite, and includes indication from the root server that the homesite is authorized to authenticate the globally unique identifier. The indication is optionally an assertion signed by the root server. In another embodiment, the authentication engine provides the identity information associated with the user to the membersite through one of redirection of the user to an authentication encoded universal resource locator, and both providing the user with a cookie containing authentication information readable by the membersite and redirecting the user to the membersite.

In a second aspect of the present invention, there is provided a method of providing user authentication to a membersite in an identity management network. The method includes obtaining the name of a homesite, providing the homesite with an authentication request and obtaining the authentication of the user from the homesite. The step of obtaining the homesite name includes obtaining from the user the name of a homesite that can provide user authentication based on user authentication information known to the homesite. The step of providing the homesite with an authentication request includes redirecting the user to the homesite in a shadow domain associated with the identity management network. The step of obtaining the authentication includes obtaining the authentication of the user from the homesite in response to the homesite receiving the known authentication information from the user, the authentication including a globally unique identifier associated with the user. In an embodiment of the second aspect, the step of obtaining the name of the homesite from the user includes the membersite examining a cookie provided by the user. In another embodiment, step of providing the homesite with an authentication request includes the user resolving a name associated with the homesite in the shadow domain to a network address. In a further embodiment the step of providing the homesite with an authentication request includes the membersite providing the user with a cookie, readable by the homesite, containing a request for authentication of the user. In yet another embodiment, the homesite can provide both user authentication information and user identity information, and the step of providing the homesite with an authentication request additionally includes the membersite providing the homesite with an identity information request, while the step of obtaining the authentication additionally includes the obtaining identification information in response to the homesite receiving the known authentication information from the user. In a further embodiment, the method includes the steps of obtaining identity information not provided by the homesite, and providing the obtained identity information to the homesite by redirecting the user to the homesite in the shadow domain, where the identity information not provided by the homesite is obtained from the user.

In a third aspect of the present invention, there is provided a method of performing a user authentication at a homesite in an identity management network. The method comprises the steps of receiving from a user, having a globally unique identifier and known authentication information, a request to provide authentication for a membersite; and providing authentication of the user to the membersite in response to receiving known authentication information by redirecting the user to the membersite in a shadow domain associated with the identity management network. In an embodiment of the third aspect, step of the providing the membersite with authentication of the user includes receiving from the user a user ID and password combination associated with the globally unique identifier of the user. In another embodiment, the step of providing the membersite with authentication of the user includes the user resolving a name associated with the membersite in the shadow domain to a network address and further, the step of providing authentication of the user optionally includes the homesite providing the user with a cookie, readable by the membersite, containing authentication of the user and the globally unique identifier associated with the user. In other embodiments, step of receiving a request to provide authentication information includes receiving an identity information request, the step of providing authentication includes the providing the membersite with identification information upon receipt of the known authentication information from the user, and the step of providing the membersite with identification is preceded by obtaining user authorization for the transfer of the requested identification information to the membersite. In another embodiment, the method includes the steps of receiving from the user, identity information obtained by the membersite; and storing the transferred identity information in a user profile database.

In another aspect of the present invention, there is provided a method of obtaining a globally unique identifier associated with user having an email address. The method comprises the steps of receiving a request from the user to associate a globally unique identifier with the email address; requesting, from a root server that associates globally unique identifiers with email address, the assignment of a globally unique identifier associated with the user email address; and obtaining the globally unique identifier associated with the email address in response to the user providing the root with a response to a challenge transmitted to the email address.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
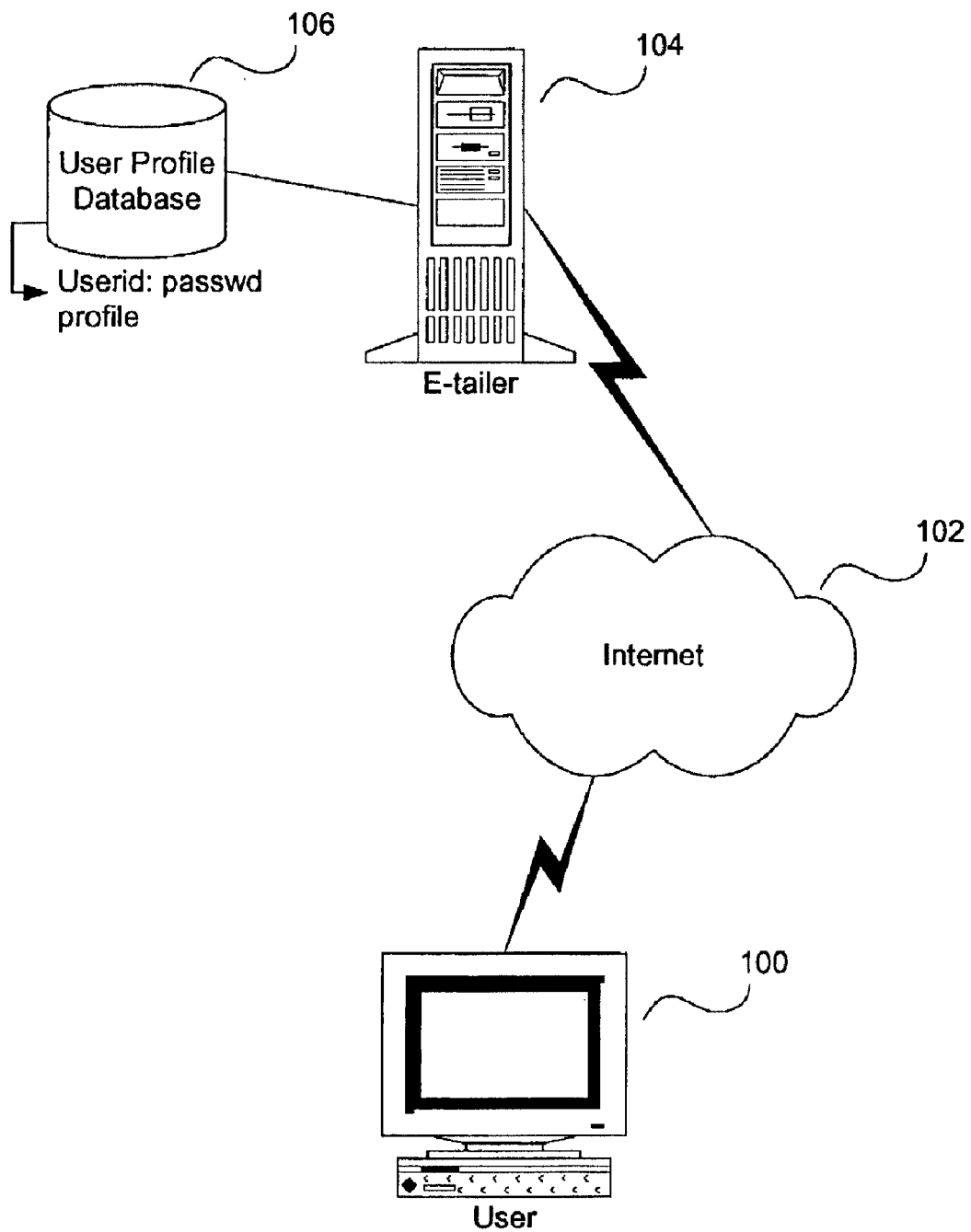
FIG. 1 is a block diagram of an identity management system of the prior art.
Figure 2:
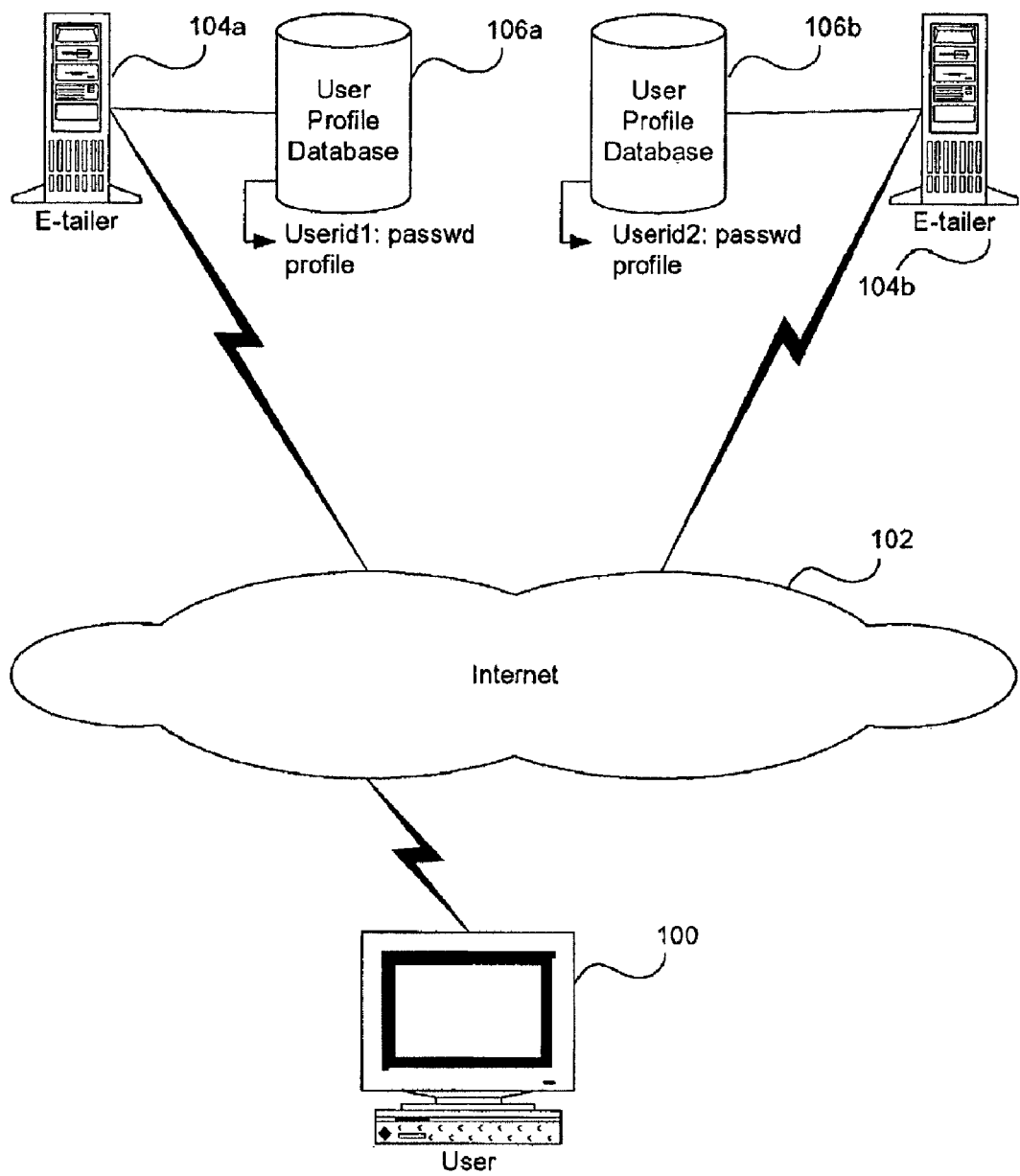
FIG. 2 is a block diagram of a identity management system of the prior art.
Figure 3:
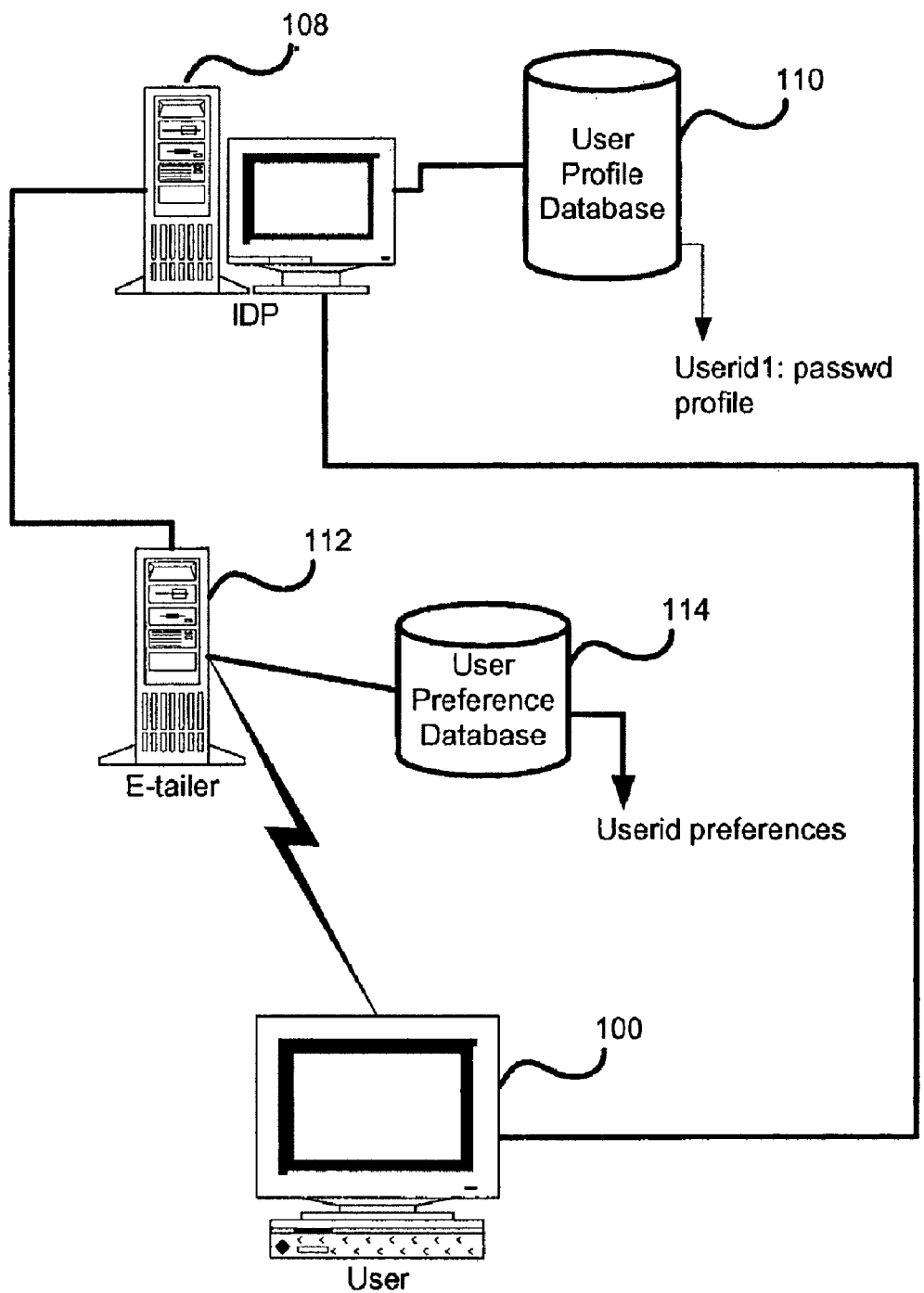
FIG. 3 is a block diagram of a hierarchical identity management system of the prior art.
Figure 4:
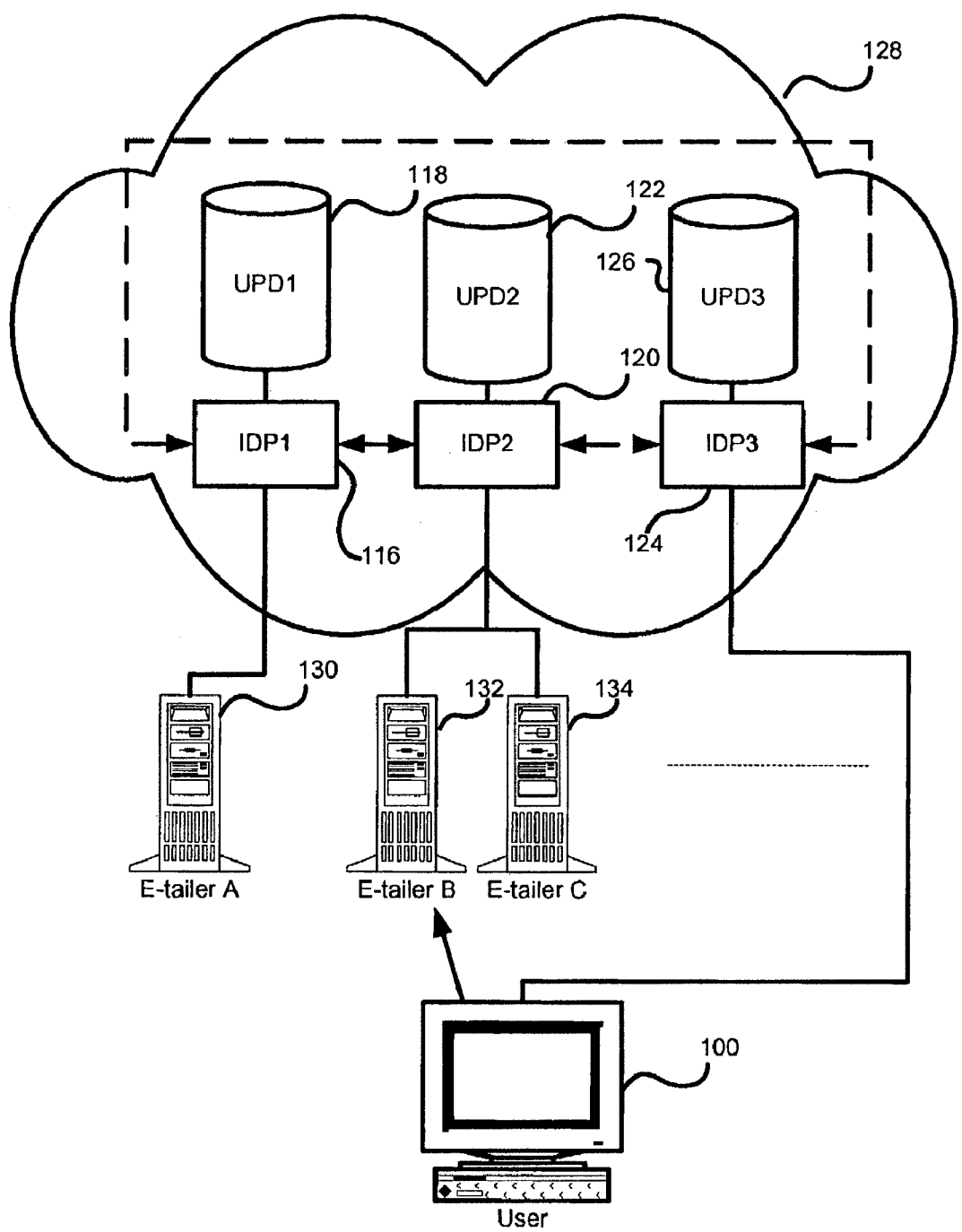
FIG. 4 is a block diagram of a distributed identity management system of the prior art.

Generally, the present invention provides a method and system for identity management.

For an identity management system to be successful, users must trust the entity storing their personal information, and must be provided a set of features that encourage the use of the system. Without a sufficient user base the identity management system cannot attract service providers, and is thus unsuccessful.

From a user perspective the system must provide a simple registration process with trusted entity. After registration, the user should be provided with a simple method of logging into services using a single login, and should be provided with a simplified mechanism for registering for those services. The user should be provided with a simple mechanism for providing the trusted entity with additional information. Finally, interactions between a vendor/service provider and the trusted entity should be largely transparent to the user.

From the perspective of the vendor or service provider, traditional identity management systems have posed problems because of the degree of trust that is required between the vendor and the authentication authority. These trust issues are resolved in the present invention by devolving the trust responsibility to the user. If a user trusts an entity to hold his personal information and serve as an authentication authority, the vendor can be satisfied that the user is comfortable in the trust relationship, and thus the vendor can trust the authentication authority. This trust relationship is sufficient so long as the authentication authority remains in the identity management network.

From the perspective of the authentication authority, an agreement made with the user can be designed to serve the business needs of the authority, rather than being dictated by a central body as it is with the Liberty Alliance. Additionally, the authentication mechanism is left to the authentication authority and the user to agree to. Thus, different authentication authorities can employ different authentication mechanisms such as user ID and password combinations, smart cards, biometric samplings and other known user authentication techniques. If a user become disenchanted with either the authentication mechanism or the service provided by the authentication authority, the user can change the authentication authority used to store and authenticate the identity information.

To administer the network, a central authority is established. This central authority defines the schema used by the authentication authority for storing the user identity information, which allows the vendors in the identity management network to request information from predefined fields. The central authority also provides a mechanism to both vendors and authentication authorities to ensure that the other party in a communication is a part of the identity management network.

All computer systems connected to a public network such as the Internet have an assigned numeric network address. This address serves as a unique identifier and additionally provides routing information so that packets addressed to a network node can be effectively routed to the specified node. To simplify addressing issues for human interactions with the network, alphanumeric domain names are assigned to nodes and a lookup facility is provided, typically through a domain name server (DNS), to allow the alphanumeric domain names to be translated into the numeric addresses. These techniques are well known to those skilled in the art. Another known use of the domain name system is to restrict access to systems within a domain. By only addressing transmissions using the alphanumeric domain name, a transmitting system can restrict systems outside the domain specified in the alphanumeric domain name from receiving the packets. The relative security of the DNS system is trusted by almost the entire Internet to be free from malicious redirection on a global scale. Shadow domains, as referred to in this application, are domains created in the internet under the namespace of a central authority. All entities in the identity management network can be assigned a name in the shadow domain that is resolved to a numeric address associated with the entity. Thus a vendor can have a shadow domain address that resolves to the same numeric address as their primary domain, or it can be resolvable to numeric address different than the primary domain, but associated to another system controlled by the vendor. Technique using shadow domains are preferably used in the present invention to ensure that both a vendor and the authentication authority are in the identity management network.

The following discussion will outline the architecture of the identity management network, the roles played by each entity, and will illustrate how the architecture provides for user registration with the identity management network; a single sign on functionality; simplified registration for services requiring user information stored by the authentication authority; a mechanism to update the schema used by the authentication authority to store user data; a mechanism for a vendor or service provider to back-fill user information to the authentication authority; a mechanism for the user to change authentication authorities while maintaining all sign ins and without providing information already stored; and a method for the central authority to remove vendors and authentication authorities from the identity management network. Additionally, security features arising from the architecture and novel trust chains for the signing of certificates and keys will be presented along with other advantages of the architecture and methods of the present invention.

In the following discussion, the central authentication authority is referred to as the root of the hierarchical distributed identity management network, or simply as the root. The authentication authority is referred to as a homesite (HS) as it provides a home for the user's data. Any site requesting either user authentication or user identity information is referred to as a membersite (MS). The user is still referred to as the user.

Figure 5:
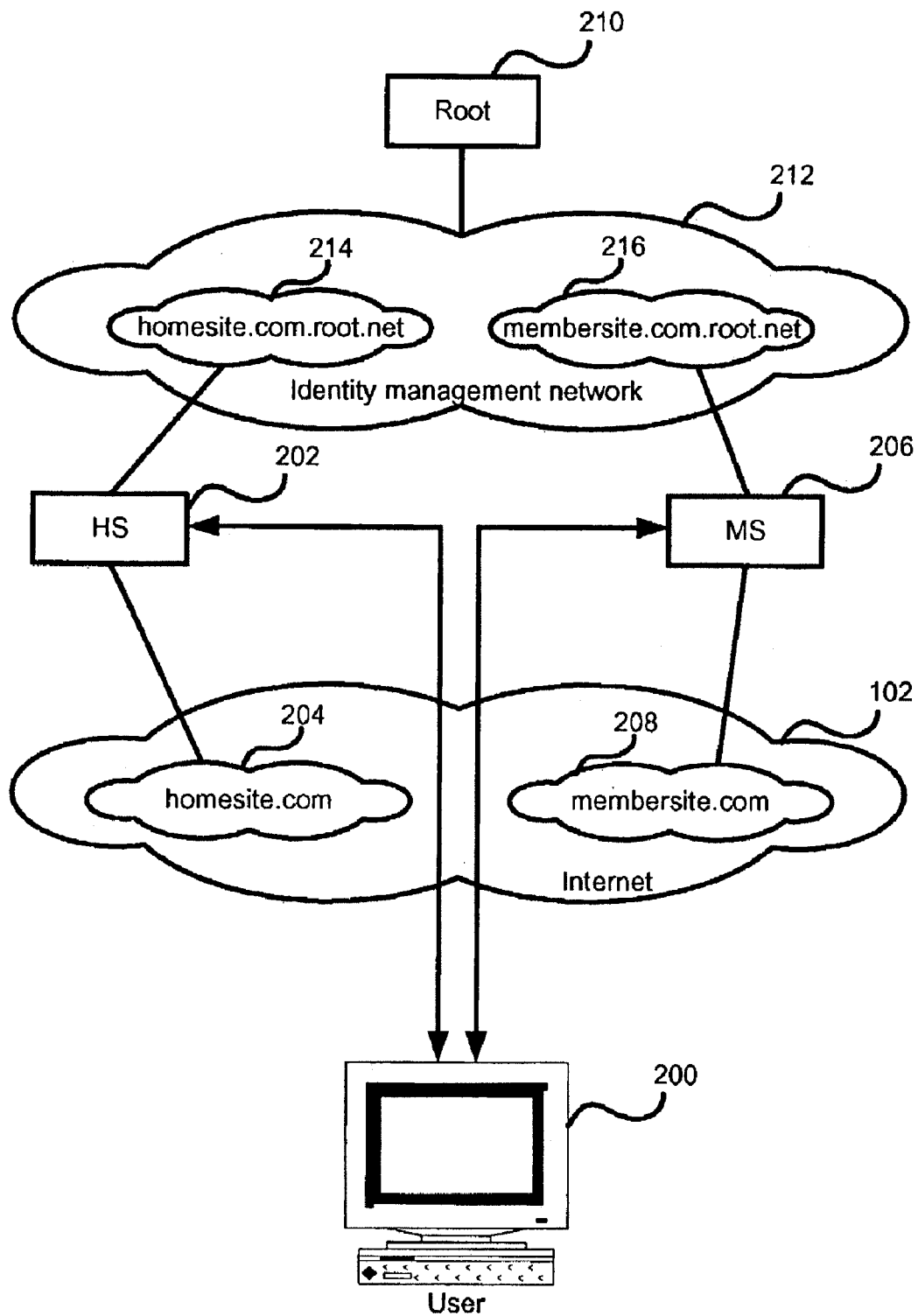
FIG. 5 is a block diagram of a distributed hierarchical identity management system of the present invention.

FIG. 5 illustrates an architecture used for the hierarchical distributed identity management system of the present invention. There are four entities in FIG. 5, the user 200, the homesite (HS) 202, the membersite (MS) 206, and the root 210. Each of the entities will be described in relation to the role that they play in the authentication and identity management method. As FIG. 5 is merely exemplary, additional homesites and membersites are not illustrated, though they may be present.

User 200 is a user having a connection to a common public network such as Internet 102. User 200 has information associated with his or her identity, such as addresses, billing information, and other personal information such as calendar based information. User 200 selects homesite (HS) 202 to store this identity information and to provide identity authentication for single sign on services.

HS 202 includes a user profile database (not shown) that is used to store the identity information for user 200. HS also associates a global identifier (GUID) with the identity information of user 200. The GUID is a globally unique identifier that is assigned to HS 202 by root 210, in a method that will be described later. HS 202 has a unique network address, and a domain name 204 associated with the address, here illustrated as homesite.com. Thus to access HS 202, user 200 can direct a web browser to www.homesite.com, and through a Domain Name Server (DNS) the address will be resolved to the address of HS 202.

Membersite 206 (MS) is a node on the public internet 102 having the domain 208 membersite.com associated with its network address. MS 206 provides a service to which user 200 subscribes, or sells a product that user 200 would like to purchase. To allow user 200 to sign in, or to obtain personal information about user 200, MS 206 requires either authentication of user 200 or a set of requested information related to user 200.

User 200 provides identity information to homesite 202 (HS). Associated with the information provided by user 200 to HS 202 is a set of identification credentials. For the purposes of the following discussion, the user credentials will be referred to as a user ID and password combination. However, one skilled in the art will readily appreciate that any number of other authentication methods, including biometric readings, static IP traces and smart card derived information, can be used in place of the user ID and password combination.

HS 202 has primary domain 206 homesite.com associated with its IP address through the conventional domain name system. HS 202 can be accessed by user 100, or any other system on the network through both a numeric IP address, and through a domain name associated with that IP address. MS 206 can also be accessed using a unique numeric IP address, or a domain associated with its IP address. In addition to having primary domains in internet 102 (not shown) both HS 202 and MS 206 are connected to each other through a shadow domain administered by Root 210. Root 210 administers a shadow domain associated with identity management network 212. Thus, while HS 202 can be accessed by user 200 at its primary domain 204 of homesite.com, and membersite 206 can be accessed by user 200 at its primary domain 208 of membersite.com, they can both be reached in a shadow domain at homesite.com.root.net and membersite.com.root.net respectively. One skilled in the art will appreciate that primary and shadow domain name pairs will both resolve to the same entity, though not necessarily the same address. The shadow domain administered by root 210 is illustrated as identity management network 212. In the model of FIG. 5, identity management and authentication is provided by a distributed hierarchical identity management system. In this system, membersites rely upon any homesite in the same shadow domain to authenticate a user. Whereas previous identity management systems encounter resistance from E-tailers or other service provides because of the amount of trust that must exist between an IDP and an E-tailer, the present model obviates that need. MS 206 relies upon HS 202 only to authenticate that the user 200 has provided the same credentials for authentication that previous users claiming to be user 200 provided. The integrity of HS 202, the ethics of its business practices, and how it treats the information of user 200 is no longer a concern of the membersite 206 and instead MS 206 relies upon user 200 to determine if HS 202 is trustworthy. If it is determined by a plurality of users that a given homesite in this model is untrustworthy, users will not use the homesite, and can petition for it to be removed from the network by root 210. Thus, policing of the homesite is a duty assigned to users, not vendors. Additionally, because the network is distributed there is no restriction placed insisting that a membersite cannot also be a homesite. As a result, fear that an IDP will usurp business, and steal customers can be addressed by allowing any membersite to also act as a homesite. The only requirement placed on any membersite or homesite is that they remain part of the shadow domain.

To establish an identity profile with HS 202, user 200 provides profile information and credentials such as a user ID and password, and receives a token indicating that he can be authenticated by HS 202. In the presently preferred embodiment, the token is a cookie that is referred to as a homesite cookie. This token is accessible to any entity in the shadow domain. When user 200 visits MS 206, it will present the token only if it is redirected to the shadow domain. To accomplish this, MS 206 can provide a link indicating that all users with identity information stored in identity management network 212 should click to either register or authenticate as the case may be. This link would then redirect the user to the shadow domain 208, so that the homesite cookies can be retrieved. The user can then be provided a second cookie and directed to HS 202 in either the primary domain 204 or the shadow domain 214. Alternately, upon visiting MS 206, user 200 can be redirected to shadow domain 216 and then back to the primary domain 208 so that the cookie is retrieved in advance of a login request. Upon request for authentication through the HS 202, MS 206 can provide user 200 with the second cookie. The second cookie can be used to request authentication and to provide a challenge to HS 202 that must be signed. This can be used to ensure that HS 202 is in identity management network 212, and is authorised to authenticate user 200. These redirections can be done in a manner that is transparent to user 200. Because user 200 can only provide the cookie to requests to originating the shadow domain corresponding with identity management network 212, confirmation that HS 202 and MS 206 are in the identity management network 212 is obtained by virtue of the request being completed. A more complete description of how authentications and information transfers are performed is presented below.

Root 210 administers the shadow domain to allow verification that HS 202 and MS 206 are affiliated with identity management network 212 by creating shadow domains homesite.com.root.net 214 and membersite.com.root.net 216 for HS 202 and MS 206 respectively. Root 210 also performs a number of other functions including the assigning globally unique identifiers (GUID) to users through interaction with HS 202; and defining of an information schema that allows membersites to request information in a standardized manner from a plurality of homesites. Root 210 also provides a mechanism for MS 206 to obtain an encryption certificate from HS 202 and be guaranteed of its authenticity. Root 210 administers the domain root.net, and is thus able to add and remove DNS lookup entries to include or exclude entities from identity management network 212. In this fashion a shadow domain is administered by root 210 in identity management network 212 to allow membersites and homesites to confirm that the other party in an authentication or information exchange is still in the network. Root 210 also preferably provides HS 202 with a signed assertion to provide a membersite along with authentication of a user, that identifies the homesite authorized to authenticate the user.

One skilled in the art will readily appreciate that the elimination of trust relationships between IDPs eliminates many of the scalability issues associated with this model. A single root 210 can administer a domain large enough for a vast plurality of homesites, which allows each membersite in the shadow domain to authenticate user information with each homesite.

To understand how the distributed hierarchical structure operates a number of standard operations will now be described. One skilled in the art will appreciate that these methods are merely exemplary and should not be viewed as limiting of the scope of the present invention.

As one skilled in the art will appreciate, identity management system 212 preferably identifies each user with a unique identifier. Whereas prior identity management systems have assigned PUIDs, a presently preferred embodiment of the present invention allows a user identity to be globally unique, associated with a single HS, and portable so that it can be moved to another HS. To implement this, each user is assigned a globally unique identifier (GUID) that is assigned by Root 210, and associated by Root 210 to both a user and a HS. If the user later wishes to change homesites, root 210 can authenticate that request and direct the current HS to forward all information about the user to the new HS. When a user registers with a MS for a service, or to complete a transaction, the GUID is provided to the MS, so that the MS can easily identify the user even after a HS change. In user interactions with the HS, the HS allows a user to associate a user-friendly identifier, much like the user ID of the prior art, with the GUID for ease of identification. Given a set of unique user ID and password combinations, or other user authentication mechanisms, HS 202 can authenticate user 200, and provide the associated GUID to MS 206 along with a root signed assertion that HS 220 is authorized to authenticate the user. Thus, user 200 interacts with HS 202 using a user friendly userid, but to all other systems in identity management network 212, user 200 is represented by a GUID. GUIDs are assigned by Root 210, and it is preferable that they are assigned only when HS 202 is able to provide a valid email address for user 200 that can be verified by root 210. Verification of the validity of an email address is preferred to ensure that HS 202 does not inappropriately request or create GUIDs for users who are not interested in joining identity management system 212.

Figure 6:
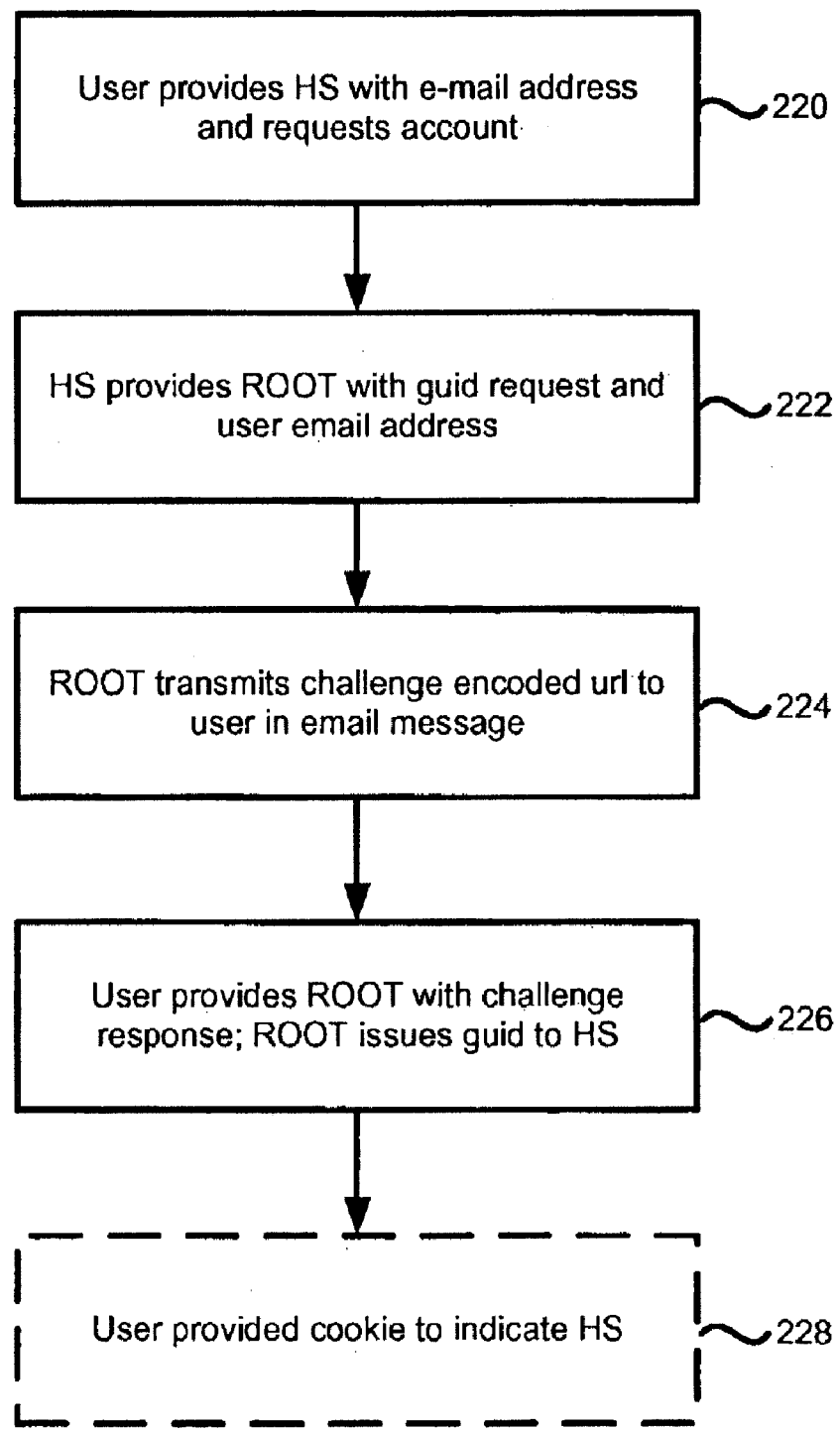
FIG. 6 is a flowchart illustrating a method of the present invention.

FIG. 6 is a flowchart illustrating the steps used in the registration of user 200 in the identity management network. Because each GUID is associated with a homesite and a homesite specific user identifier, it is possible for each homesite to employ its own method of determining a user ID suitable for each user. GUIDs are assigned by root 210 to ensure their uniqueness across the network and to ensure that a homesite is not creating fictitious users in the network. In step 220, user 200 registers at homesite 202 and requests a homesite specific user ID to which a GUID will be associated. In making this request, user 200 provides homesite 202 with a valid e-mail address. Homesite 202, prior to obtaining a GUID, communicates the user e-mail address to root 210 and requests that a GUID to be assigned to this user e-mail address in step 222. Upon receiving the GUID assignment request from homesite 202, root 210 verifies the validity of the e-mail address in step 224 by sending an authentication challenge to the e-mail address. User 200 receives the authentication challenge in the transmitted email and communicates with both root 210 and homesite 202 in step 226 to prove the validity of the e-mail address. Upon successful receipt of the challenge response, root 210 assigns the e-mail address a GUID, and associates with that GUID both the valid email address and a homesite identifier associated with the homesite that requested the GUID. The GUID is preferably stored by HS 202 in an assertion signed by root 210 that associates HS 202 with the GUID for proof to a MS that HS 202 is authorized to authenticate the GUID. A similar assertion associating the GUID and an email address can also be stored. These assertions are preferably signed and provided with an expiry date to ensure HS 202 does not have the ability to authenticate a user after the user has moved their GUID to another HS In another embodiment. When an entity joins the identity management network 212 as a homesite, the homesite can demonstrate to the satisfaction of root 210 that the email addresses of existing accounts are valid, and without requiring the transmission of a challenge to the email address, root can issue GUIDs for each existing account. This allows a homesite with an existing user base to join the identity management network 212 without having each of its existing users respond to a challenge email. To demonstrate the validity of the email addresses to root 210, the homesite can provide proof of prior transmissions to the user as evidence of the validity of the email address.

Because the trust relationship is between user 200 and HS 202, it may be desirable for the challenge email to be branded under the identity of HS 202. To accomplish this, along with the request for a GUID, HS 202 can provide root 210 with an email template for use with the challenge. Thus, the provided template will allow root 210 to send an email that will be branded by HS 202. The template will allow HS 202 to ensure that user 200 is presented with the challenge email having the logo of HS 202, and that the challenge email is presented in a language specified by HS 202. This ensures that the sign in process is seamless to user 200.

In a presently preferred embodiment the step of transmitting a challenge in an e-mail message in step 224 is performed by transmitting a challenge encoded URL to the user. In step 226 the user responds to the challenge by clicking on the URL, and is directed to the destination address. The ability of user 200 to click through a link is considered sufficient proof that a valid user has received the email message. Root 210 will not issue a GUID to HS 202 until it receives confirmation that the user has clicked through. This can be achieved either by having the challenge URL direct user 200 to root 210, which then redirects user 200 to HS 202 along with a GUID, or the challenge can direct user 200 to HS 202 and provide HS 202 with the challenge response to provide to root 210 on behalf of user 200. The URL can be directed to HS 202 at either its conventional address or at its shadow domain address to serve as a further guarantee that HS 202 is in the identity management network 212.

In a presently preferred embodiment either the root 210 or the homesite 202, upon verification of the user 200, provides user 200 with a cookie that will be accessible to any member of the shadow domain, which constitutes homesites, membersites and root 210. The placement of the cookies is optional step 228. This cookie is preferably referred to as the HS cookie and identifies the homesite that should be used to authenticate the user. In a presently preferred embodiment, the homesite cookie provided to the user identifies the homesite by providing an https URL which provides MS 206 with the location that user 200 should be redirected to, and additionally provides MS 206 with the location that the HS certificate can be obtained. In another embodiment the homesite cookie can provide a number of URL's including one indicating where to redirect the user and one indicating where MS 206 can obtain a certificate from the homesite. Obtaining the HS certificate is important for verification of signatures as is described below. In another preferred embodiment, the cookie both identifies the homesite 202 and includes an assertion by root 210 that the identified homesite is the homesite that can authenticate the user. One skilled in the art will appreciate that MS 206 can obtain information about where to redirect the user from what is referred to as a command URL, while information about where to obtain the HS certificate can be obtained from a certificate URL. Both these URLs can be in the homesite cookie, they can be provided in the DNS system, and the command URL can additionally be provided in the HS certificate. Thus, the homesite cookies may reference a location from which the certificate can be obtained, and in the certificate MS 206 will find the location of HS 202, or only part of a URL will be in the cookie, and based on the URL fragment, MS 206 will add on known prefixes and suffixes to create both the command and certificate URLs.

The above described registration process will now be described from three perspectives, the perspective of the user 200, the homesite 202 and finally root 210. From the perspective of user 200, user 200 visits homesite 202 and requests an identification management account. In making this request, user 200 provides a valid e-mail address and is informed that to complete the process, an e-mail message is being sent to the provided email address. Upon receipt of this e-mail message, user 200 responds to the challenge, preferably by clicking on the URL and thus verifying the validity of the e-mail address. At this point, user 200, either directly or indirectly, connects to homesite 202 and an identity management account is established. Thus, from the perspective of user 200, registration for an account is simple process that transparently involves root 210 and thus does not rely upon user 200 trusting root 210 at all. Instead all trust issues are related to user 200 trusting the homesite 202. From the perspective of homesite 202, homesite 202 receives a request for a new identity management account from user 200, this request being accompanied by an e-mail address. The e-mail address is then forwarded to root 210 along with a request for the assignment of a GUID. Homesite 202 then receives the GUID upon successful response to a challenge. In one presently preferred embodiment the response to the challenge is provided to the homesite 202 by the user 200 via the re-direction URL. This challenge response is then transmitted by the homesite 202 to the root 210, and in response root 210 provides the homesite 202 with a GUID to associate with the user 200. In an alternate embodiment, the challenge response is provided to the root 210 by the user 200 directly, and the homesite 202 receives a GUID when the user 200 is re-directed to the homesite 202 by the root 210. One skilled in the art will appreciate that communications between the root 210 and the homesite 202 for the purposes of transmitting the actual GUID are preferably performed in a manner that renders the communication transparent to the user. As will be apparent to one skilled in the art, passing information transparently between root 210 and HS 202 can be achieved using encoded URLs in redirections, redirecting the user with a post based HTTP request, user redirections with cookies as a transfer mechanism, and back channel communications among other known techniques. These same channels can be used for communications between homesites and membersites in later methods.

From the perspective of root 210, root 210 receives a request from the homesite 202 for a new GUID to be associated with the provided e-mail account. To verify that the e-mail account is valid the root 210 transmits to the e-mail account an e-mail message including a challenge. Preferably the challenge is an encoded URL that will be clicked upon by the user 200. Upon user 200 clicking on the challenge encoded URL, root 210 will receive a challenge response, either from the user 200 or the homesite 202. Upon receipt of this challenge response, the root will assign a GUID to the e-mail address, and associate it with the homesite 202. This GUID will be transmitted to the homesite 202, using known techniques.

One skilled in the art will readily appreciate that this process ensures that the root is not assigning GUIDs to a homesite without a valid reason. This maintains the integrity of the identity management system.

Another role played by the root 210, in addition to the assignment of GUIDs, is the definition of a schema which HS 202 will use to store identity data. A defined schema allows MS 206 to request subsets of the user information, and to make any request using predefined field names to ensure a proper response. It should be noted that in a presently preferred embodiment there is no requirement for HS 202 to store the full schema, and in the event that it is asked to provide information about a user that it does not store, HS 202 will either inform user 200 that it does not store the requested information and prompt the user to provide it and then pass the stored and obtained information to MS 206, or HS 202 will provide MS 206 with the subset of the requested information that is stored, and leave it to MS 206 to prompt user 200 for more information. As a result of not requiring HS 202 to store the full schema for any user, root is able to add new fields to the schema at regular intervals. This allows root 210 to add new fields to store information about new reward programs, or unanticipated requests from membersites. In prior art systems, a schema once defined became static, and the ability to add new fields to the schema was difficult if not impossible. By not forcing a homesite 202 to store the full schema, root 210 can update the schema at any time and rely upon homesites to connect and request the new schema at their convenience. Thus, homesite 202 can check for a new schema at regularly defined intervals, whenever a new GUID is requested, or accompanying any other transaction with root 210, or using any other schedule defined by homesite 202. In a presently preferred embodiment the schema is stored as an extensible mark-up language file that can be queried to obtain a variety of information.

Figure 7:
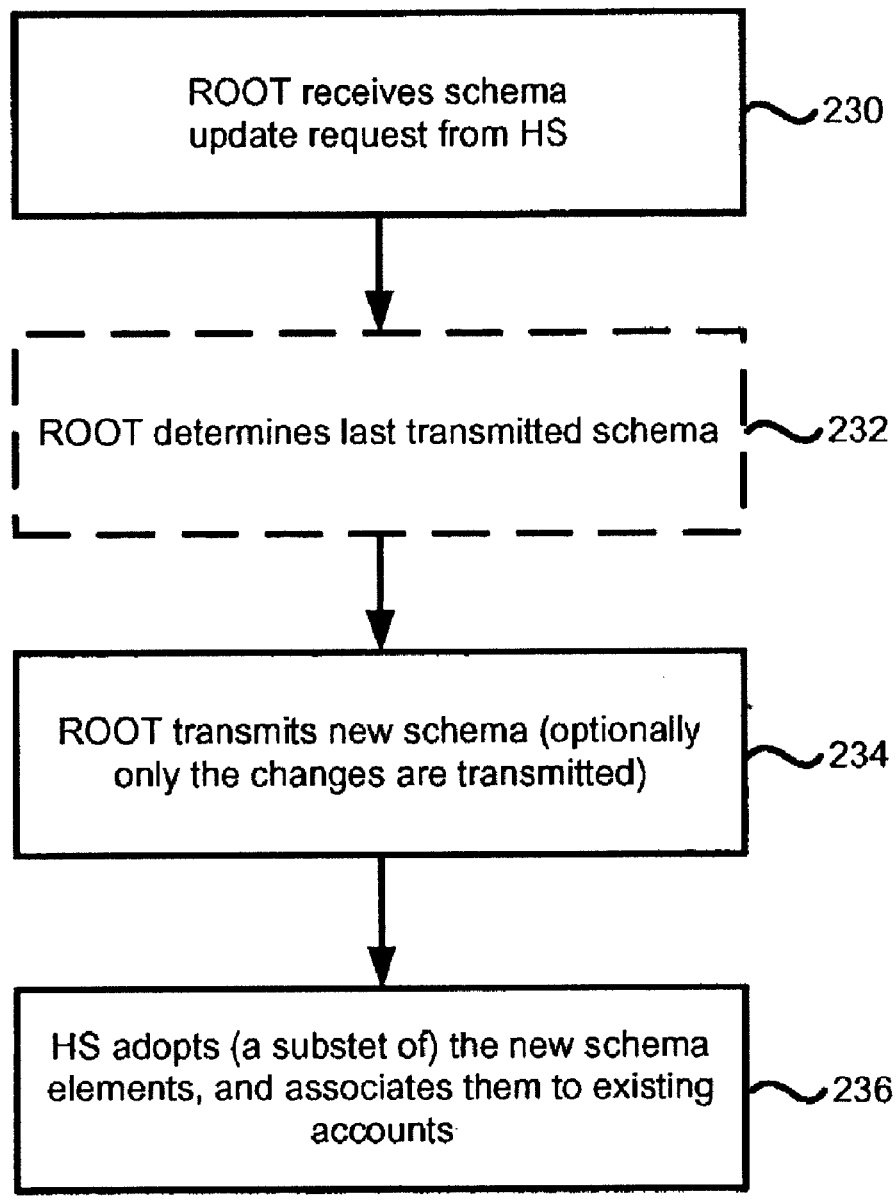
FIG. 7 is a flowchart illustrating a method of the present invention.

FIG. 7 illustrates a method by which a homesite 202 is able to obtain an updated schema from the root 210. In step 230, the homesite 202 transmits a schema update request to the root 210. In response to the receipt of the schema update request from the homesite 202, the root 210 preferably determines the last transmitted schema in step 232. This preferably entails determining a last transmitted schema date through analysis of the transmitted update request. In step 234, the root 210 transmits a new schema to the homesite 202 that transmitted the update request. In a presently preferred embodiment, the root 210, using the determined last transmitted schema, transmits only an updated information list, including the changes to the schema, without transmitting the entire schema. In step 236, the homesite 202 receives the transmitted new schema information and adopts the new schema elements, and associates unpopulated fields corresponding to each of the new schema elements with each user account. Any of a number of known techniques can be used to populate the new fields, and one skilled in the art will appreciate that the following examples are merely exemplary, and not exhaustive. In one embodiment, upon receiving a new schema, the homesite 202 will e-mail the user to notify them that additional information can be stored in their user profile. In an alternate embodiment, at the time of the user's next log-in to the homesite 202, the user will be notified that new schema fields exist and will be prompted to click on a link that will allow the user to populate the new fields.

One skilled in the art will appreciate that a number of similar techniques can be used to transmit the new schema to membersites. However, it is likely that membersites will require operator interaction to incorporate requests for new schema held information when a new schema is received.

Figure 8:
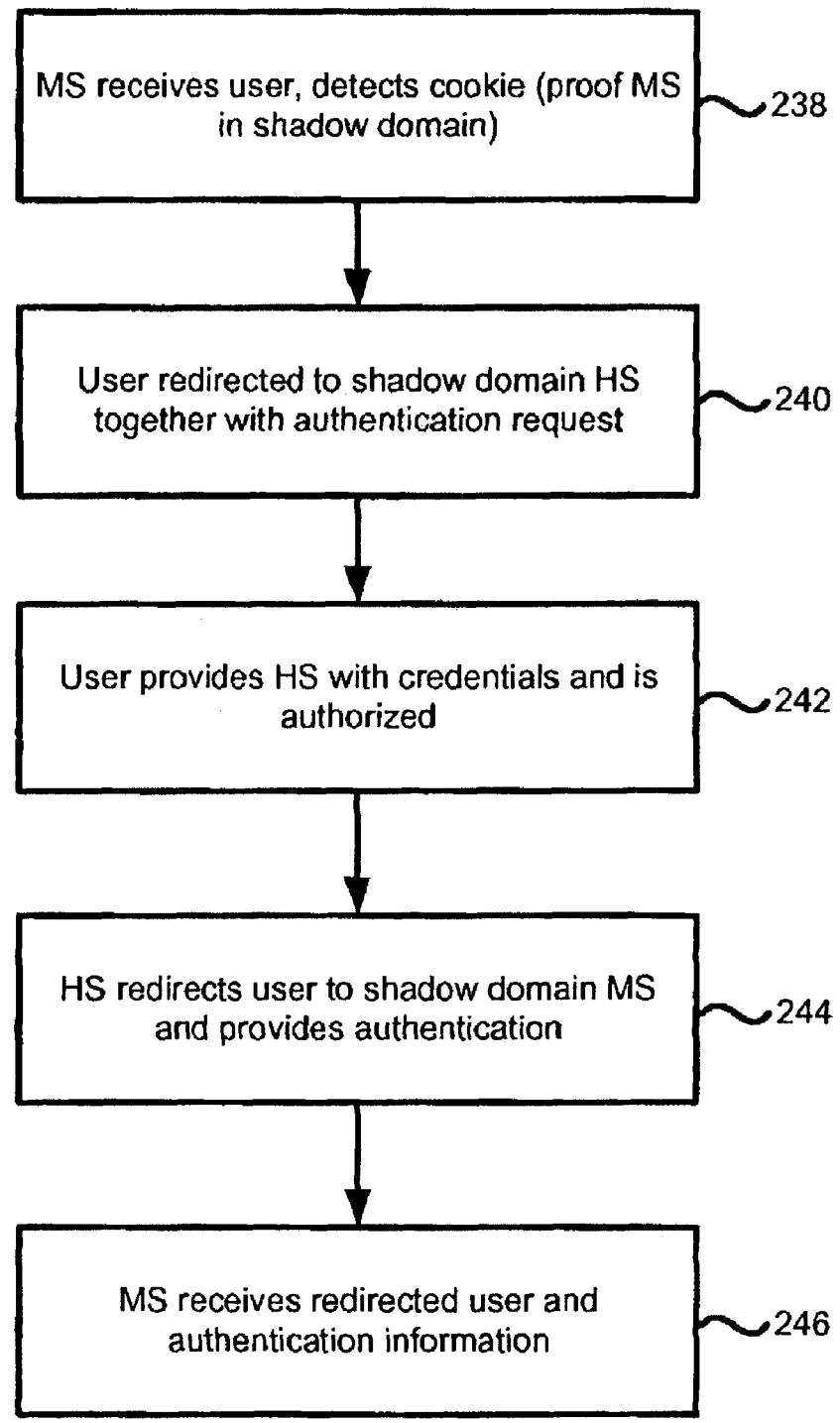
FIG. 8 is a flowchart illustrating a method of the present invention.

A method of a membersite requesting authentication of a user is described in FIG. 8. To provide single sign on abilities to users, the present identity management system preferably employs the homesite cookie provided to user 200 in step 228 of FIG. 6. This cookie preferably identifies the homesite associated with the GUID. To ensure that this information is available to all sites in identity management network 212, the cookie is preferably readable to sites in the domain root.net. Thus, if a membersite attempts to access the cookie, and is not in the shadow domain, the attempt to read the cookie will be rebuffed. However, if membersite 206 is part of the shadow domain, it will obtain a GUID and an indication of the homesite associated with the GUID in step 238. As described earlier, MS 206 must redirect to the shadow domain to retrieve the cookie. This can either be done with the user clicks a link, or at a previous time. The homesite cookie identifies the homesite that can authenticate user 200. Upon determining that homesite 202 is identified in the homesite cookie, membersite 206 re-directs the user to homesite 202 with an authentication request in step 240. To retrieve the authentication request, HS 202 must be in the shadow domain. Thus MS 206 can redirect user 200 to HS 202 in the shadow domain 214, or in the primary domain 204. If HS 202 receives user 200 in the primary domain 204, it will redirect user 200 to the shadow domain 214 so that it can retrieve the authentication request. If homesite 202 is no longer in the shadow domain, the redirection to retrieve the cookie will not be resolved to a valid address, and thus the operation will fail. However, if homesite 202 is in the identity management network 212, the re-direction request will allow shadow domain address 214 to be resolved to an address that results in user 200 being transferred to homesite 202. In step 242, the user provides homesite 202 with authentication credentials. Upon completion of the authentication homesite 202 re-directs the user to membersite 206 either in the shadow domain 216 or in the primary domain 208, in step 244 and provides membersite 206 with user authentication information that is accessible in shadow domain 216. Thus depending on the redirection provided by HS 202, MS 206 may be required to redirect user 200 to the shadow domain 216. Upon receipt of the authentication and the re-direction of the user, membersite 206 allows user 200 to log-in, in step 246. In a presently preferred embodiment, the authentication will be signed by HS 202, and will be accompanied by an assertion signed by root 210 that HS 202 is authorized to authenticate the GUID.

One skilled in the art will readily appreciate that communications between homesite 202 and membersite 206 can be effected in any of a number of ways. In a presently preferred embodiment, membersite 206, upon detection of the homesite cookie, re-directs the user to homesite 202 in the shadow domain as described in step 240 and requests information by providing user 200 with a second cookie to identify the fields in the schema that are required to allow the user to log-in to membersite 206. Upon receipt of the re-directed user in step 244 and the subsequent authentication, homesite 202 in step 244 will preferably re-direct the authenticated user to membersite 206 in the shadow domain, and provide the authentication information either via the cookie or other known techniques.

The above described method will now be described from the perspective of the user, the membersite, the homesite, and finally from the perspective of the root. From the perspective of the user, the user visits a membersite and preferably clicks on a link indicating that they are part of the identity management network. This link re-directs the user to homesite 202 where credentials are presented to verify identity. Upon successful authentication of identity, the user is re-directed back to membersite 206 and allowed in.

From the perspective of a membersite, membersite 206 receives an indication from a user that it is registered with a homesite in the identity management network. Membersite 206 then requests and receives the cookie from user 200 in the shadow domain. This cookie identifies homesite 202 as the homesite that can provide authentication. Membersite 206 re-directs user 200 to homesite 202 and requests that homesite 202 authenticate the user 200 and re-direct the user back to membersite 206 after authentication. Membersite 206 then receives the user 200 via a re-direction URL and additionally receives an indication that the user has been authenticated. The indication is preferably accessible in the shadow domain 216, and is accompanied by a root signed assertion as described above From the perspective of homesite 202, user 200 establishes a connection as a result of a redirection from membersite 206. User 200 typically provides a request from membersite 206 to authenticate the identity of the user and re-direct the user upon authentication back to membersite 206. Typically, this request for authentication and redirection is stored in a cookie provided by the user. Homesite 202 then requests that the user supply credentials to authenticate their identity. Upon receipt of these credentials, and authentication of the identity of user 200 based on the presented credentials, homesite 202 then re-directs the user to membersite 206 and provides membersite 206 with an indication that the user has been authenticated.

Root 210 is called upon twice during this process. In both cases, interaction with root 210 is performed to allow the user to be re-directed to a shadow domain name. Thus, when membersite 206 re-directs the user to homesite 202 in the shadow domain, root 210 receives a request for shadow domain name resolution. Upon receipt of this request, root 210 determines the present state of the shadow domain entity. Based on the shadow domain entity's present state, root 210 resolves the shadow domain name to an address. Thus, if homesite 202 is presently a part of the identity management network, it shadow domain name is resolved to the same IP address that its real domain name would be resolve to. However, if homesite 202 has been removed from the identity management network, resolution of the domain name will result in either an error, or re-direction to a page explaining to the user that homesite 202 is no longer part of the identity management network. Similarly, when homesite 202 re-directs the user to membersite 206, root 210 receives a shadow domain name resolution request, determines the present state of the shadow domain entity and based on that determined present state resolves the shadow domain name address.

One skilled in the art will readily appreciate administration of the shadow domain by root 210 is achieved by maintenance of sub-domains under the root.net domain. Thus, the addition of either a membersite or a homesite to the identity management network entails root 210 modifying a domain name server look-up table to associate an IP address or domain name with a shadow domain name. One skilled in the art will appreciate that due to synchronization of domain name servers on a public network such as the internet, the role of root 210 in resolving the domain names can also be performed by a number of domain name servers that receive data from the root. However, one skilled in the art will appreciate that from a logical level due to the synchronization of domain name servers, all shadow domain resolution requests can be considered to be resolved by root 210.

In addition to providing a single sign on functionality, the present invention provides a mechanism for user 200 to store identification information with HS 202, and have HS 202 provide the information to MS 206 to facilitate registration for the services offered by MS 206. This facility appears to user 200 to be a form-filling functionality.

Figure 9:
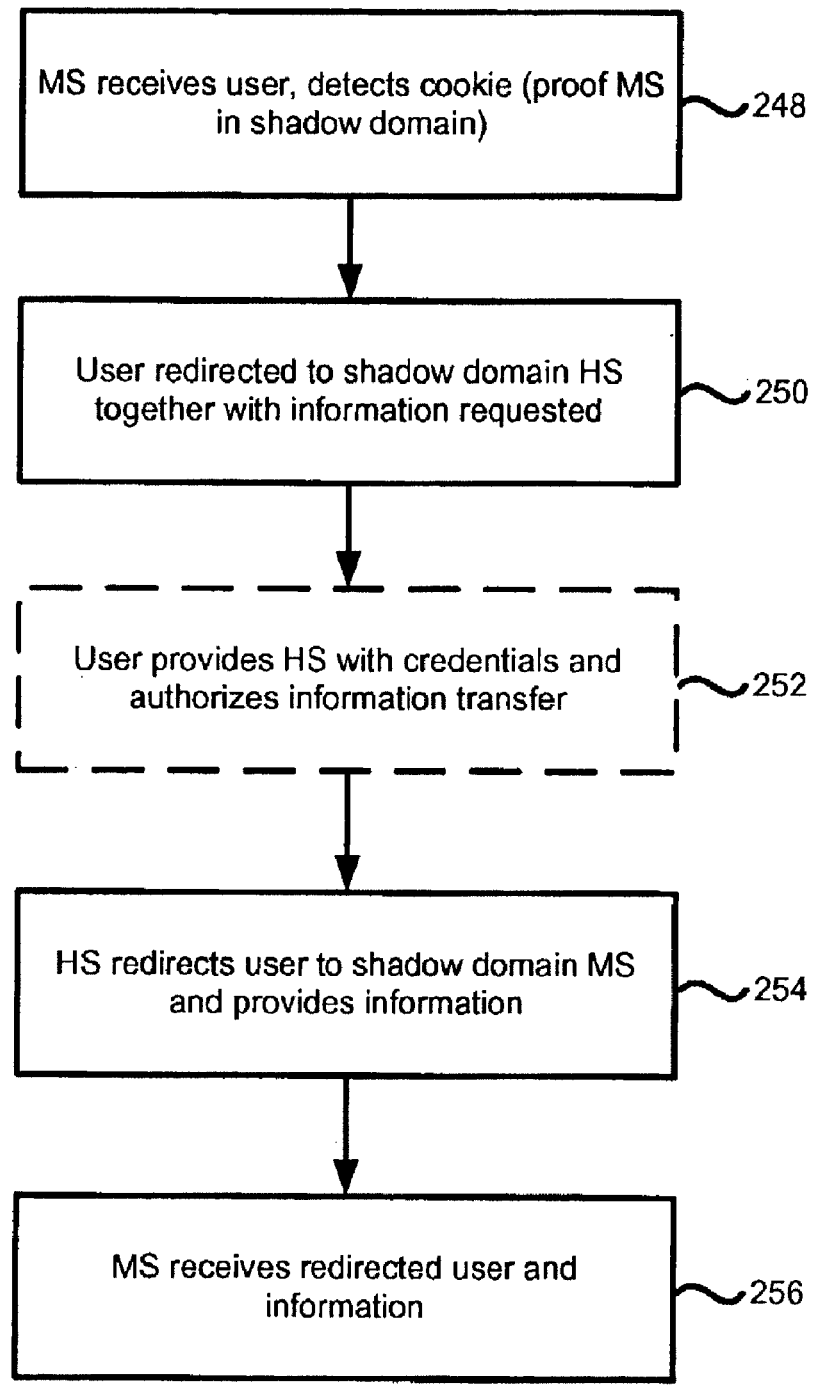
FIG. 9 is a flowchart illustrating a method of the present invention.

FIG. 9 illustrates a method of providing identity information stored by HS 202 to MS 206. This method allows user 200 to begin a sign up procedure at MS 206, and have HS 202 fill in the fields in the registration form for which there is a corresponding stored value. Much as with the single-sign on facility provided by the method of FIG. 8, the form-filling method of the present invention starts with user 200 indicating to MS 206 that identification information can be provided by a homesite in identity management network 210. This indication preferably takes the form of clicking on a hypertext link that indicates affiliation with a homesite. After receiving the user notification, MS 206 retrieves the cookie provided by user 200 in the shadow domain 216 and determines a homesite for user 200 in step 248. User 200 is then redirected to HS 202 along with an information request in step 250. The information request contains a request for the information needed to fill out fields the form, it does not have to include a request for all the information on the form, and does not need to request all the information stored by HS 202, thus, MS 206 is able to request a subset of the information stored by HS 202. HS 202 preferably authenticates user 200 upon receiving the redirection in step 252 to ensure that no one is fraudulently requesting the information of user 200. Upon authentication, user 200 provides HS 202 with authorization to transfer the requested information to MS 206. Once again this step is considered optional, through preferred, as it can depend on the terms of service agreed upon between HS 202 and user 200. HS 202 then redirects user 200 to MS 206, preferably in the shadow domain to ensure that MS 206 is in the identity management network 212. Along with the redirection, HS 202 provides MS 206 with the requested information in step 254. In step 256, MS 206 receives both user 200 being redirected from HS 202, and the requested information. If HS 202 has previously authenticated user 200, HS may not re-authenticate user 200, and instead will only verify user 200 has been authenticated.

One skilled in the art will appreciate that the data stored by HS 202 can be requested by MS 206 in a number of ways. For simply queries, MS 206 can request name and value pairs from HS 202 provided in such a fashion that HS 202 can provide a response in a format that allows MS 206 to receive the information in a desired order. Additionally MS 206 can request information using structured queries to HS 202. These structured queries are typically replied to using XML based results, though other known techniques of structured replies can also be provided. Queries can also be made to information that HS 202 determines dynamically, or to information that is not directly hosted by HS 202, and instead is hosted by a third party that HS 202 maintains a link to. For simple queries based on name value pairs, MS 206 can specify the name with which a value is returned so that a value stored in the schema under one name can be returned to a form provided by MS 206 using the form based names used by MS 206. This allows membersites with pre-existing data collection systems to request information from homesites and receive data via a POST operation to populate the fields in their HTML form. This allows MS 206 to join identity management network with minimal modification to their existing pages. Additionally, in a presently preferred embodiment, the simple query will includes a redirection URL value, so that HS 202 can redirect user 200 to the next page in the data collection phase at MS 206. To enable the automated form filling, HS 202 will provide MS with the requested information associated with the provided names, optionally in the requested order, and will direct user 200 to the next page in the sign-in procedure by providing a redirection URL that automatically posts the provided data to MS 206. For structured queries, HS 202 will preferably redirect user 200 to MS 206 with a POST operation that provides the requested structured data, preferably in the form of an XML file. HS 202 may store machine readable data, such as a photo of the user, and can provide it in response to a query from MS 206. Dynamic data may include such data as a length of time since the last authentication, and can be provided in response to either simple or structured queries. As noted above, HS 202 can store data as a reference to another site, for example, user 200 may have calendar data stored with a third party to which HS 202 stores a link. MS 206 may be an airline that provides a structured query to obtain an XML based report on the availability of user 200 on a given day to schedule a flight. HS 202 can provide either a reference to the calendar site, or can query the calendar site obtain the results and provide them to MS 206. Communication with third parties, such as a calendar site is preferably achieved using defined protocols.

Other data that can be provided in response to queries includes third party assertions that are associated with the GUID. Assertions have previously been discussed in reference to the assertion signed by the root 210 that asserts that a homesite is authorized to authenticate a GUID, but assertions can be provided by other entities as well. Government agencies may provide an assertion associating a birth date with a GUID, so that MS 206 can receive a signed assertion from a trusted authority that user 200 is above a certain age. A mechanism for MS 206 to obtain a certificate or public key with which to authenticate the assertion is discussed below. Other assertions may include indications that users have achieved a premium service level with a reward program. This assertion could be used by a membersite to provide user 200 with a discount for a service based on the premium reward membership. Other assertions, signed by third parties, will be apparent to those skilled in the art. Assertions can either be stored by HS 202, or they can be stored as links by HS 202, to allow MS 206 to retrieve the assertion directly from the third party.

Whereas simple queries are commonly responded to through URL encoding, extensible queries are preferably responded to by passing information to MS 206 through a HTTP post operation.

Figure 10:
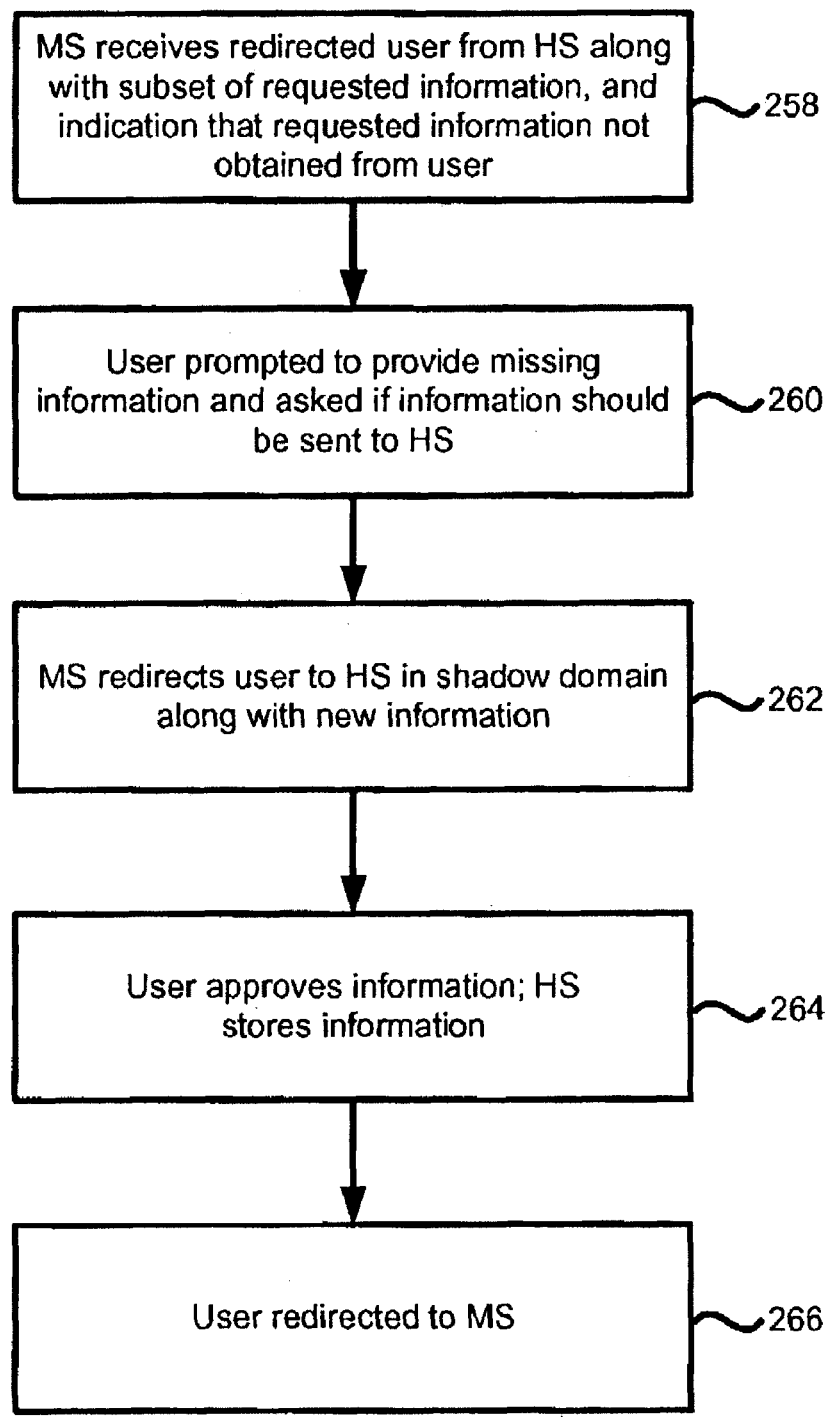
FIG. 10 is a flowchart illustrating a method of the present invention.

Because the schema used to store user information is dynamic, a mechanism for acquiring user information after an initial sign up is required. While it is envisaged that HS 202 can prompt user 200 to add information during an authentication or information request, the present invention provides a novel method of obtaining user information for storage by HS 202. This method is illustrated in the flowchart of FIG. 10.

The present architecture allows the user to populate schema fields or modify existing information stored by the homesite 202 from participating membersites 206. This method is illustrated in FIG. 10. Upon requesting and receiving information about the user from the homesite 202, the membersite 206 determines in step 258 that it requires more information, and thus prompts the user 200 to enter this information, in an alternate embodiment, MS 206 asks the user to confirm the information provided by HS 202. In step 250 the user provides this information to the membersite 206 and indicates, preferably by clicking on a hypertext link, that this information should be transmitted back to the homesite 202. At this point, the membersite 206 re-directs the user to the homesite 202 using the shadow domain address and transfers to the homesite 202 the information provided by the user. The transfer of information provided by the user can take place using back channel communication, an encoded URL in the form of a simple query, or in cookies carried by the user. After receipt of both the re-directed user, and the transmitted information, the homesite 202 presents the user with the information, and asks for approval of the information. Upon receipt of the approval of the information from the user 200 in step 254, the homesite 202 stores the information in the schema. At this point, the user is re-directed back to the membersite 206 in step 256. In another embodiment, MS 206 determines that as a result of its interaction with user 200 that new information is available that should be provided to HS 202. MS 206 then requests user authorization to transfer the data back to HS 202, as in step 260, and the process continues as described above. As an example of the alternate embodiment, MS 206 is an airline that has booked a flight for user 200. MS 206 has structured information that should be provided to HS 202 to store in the calendar of user 200. The structured data is preferably transferred as an XML file containing the flight number, destination, takeoff and landing times and other related information. HS 202 can respond to the update by either storing the data if it hosts the calendar for user 200, by redirecting the information to the calendar provider if it is a third party, or by providing MS 206 with an address to which the information should be sent. Thus the information provided to HS 202 can be structured or simple, and it can be either stored or referenced data. In a presently preferred embodiment, MS 206 does not require user authorization for all updates of HS 202 information. In the above example of an airline booking, if the flight is delayed, MS 206 can preferably automatically update HS 202 without requiring user approval.

As noted earlier, one of the benefits of the present invention is that the information stored by a homesite is portable to another homesite. There can be any of a myriad number of reasons that a user would want to move their data from one homesite to another, including cost, the amount of information a homesite is willing to store, and the terms of service the homesite operates under. Whereas in prior art systems there was either no equivalent to transfer data to, or the data was non portable, the present system ensures the portability of user data by assigning user 200 a unique GUID and requiring that HS 202 stores user information in a defined schema. Thus, to change a homesite, user 200 visits a second homesite and indicates requests a new account to be associated with an existing GUID. By maintaining the same GUID, a user will be able to maintain any accounts membersites that have stored information using the GUID as an identifier. Much as with the registration process, root 210 issues a challenge to user 200, requiring the user to respond to the challenge to ensure that a misbehaving homesite is not attempting to steal users from another. The transfer of registration process is identical in the challenge response phase, and upon successful completion of the challenge response, root 210 issues a directive to the existing homesite to transfer all schema related information to the new homesite. This can be accomplished either using back-channel communications, URL encoding, or preferably by root 210 redirecting user 200 to the original homesite, having the original homesite provide user 200 with a cookie containing all stored personal information, and then redirect user 200 to the new homesite. The redirection from the first homesite to the second homesite can be accomplished by redirecting the user 200 to root 210 so that the original homesite does not know where the user has gone to. Upon being, either directly or indirectly, redirected to the new homesite, user 200 provides the cookie that stores all the schema related information, and receives a new cookie confirming the GUID, and indicating that the new homesite is the site to be associated with the GUID In a presently preferred embodiment, to obviate the need to retransmit challenge emails, the newly selected homesite can direct the user to the initial homesite for authentication. Successful completion of this authentication can be considered by root 210 as proof that the user has the authority to transfer the GUID to another homesite.

Whereas prior art methods of identity management provided membersites with PUIDs, the present invention provides GUIDs that due to their global nature can be used to obtain third party assertions. PUIDs cannot support third party assertions without the IDP sharing the PUID mapping with a third party, thus negating the purpose of a PUID. To provide user 200 with the advantages offered by PUIDs, HS 202 can allow a user to obtain multiple GUIDs. By obtaining multiple GUIDs, user 200 can create a plurality of online personas so that different membersites cannot correlate behaviour online. This provides user 200 with the option of obtaining the security of PUIDs, while still retaining the benefits of GUIDs. To allow the management of multiple GUIDs, user 200 will be prompted by HS 202 upon authentication as to which GUID should be provided to a membersite. This allows a user to provide HS 202 with one set of information, and have different profiles set up for each GUID. Thus a work based persona with a GUID can default to providing an office phone number and address when a membersite requires a phone number and address, while a home based persona with a different GUID can default to providing a home phone number and address when requested.

As discussed above, assertions are preferably provided by root 210 to provide proof to a membersite that HS 202 is authorized to authenticate a GUID. Preferably this assertion is signed using a private key or certificate, and the signature can be verified using a public key or certificate. The certificate is preferably obtainable through contact with root 210 over a secure data channel. To ensure that the certificate has not been tampered with, the certificate of root 210 is preferably signed by a first certificate authority (CA), and transmitted to a requesting party over an SSL link that is signed by a second distinct CA. This double chain of signatures requires that both the first and the second CA be compromised for a malicious party to be able to impersonate root 210. The authentication information provided by a homesite is preferably signed by the homesite, so that it too is a credential. This information is preferably signed by the homesite, so that the membersite can be sure that it has not been tampered with, or that the homesite is being impersonated by a third party. To verify assertions made by the homesite, a membersite can obtain a certificate from the homesite over an SSL connection signed by a CA, with the homesite certificate signed by the root. Because the CA and the root are distinct, there is another double chain for security, requiring a breach of security at both the CA and the root. Third party assertions are preferably signed, with a certificate available over an SSL connection, the certificate signed by root or a CA, and the connection signed by a CA distinct from the one that may have signed the certificate. The above double signature transmission is preferred for the verification of certificates transmitted in identity network 212.

In a presently preferred embodiment, when presented with a signed assertion, MS 206 will obtain the certificate used to verify the signature and cache the certificate. In the next signature verification that uses that certificate, MS 206 does not have to re-request the certificate, but must be sure that the certificate is up to date. To do this, MS 206 performs a DNS txt lookup on the shadow domain name of the certificate holder. Root 210 in providing DNS services for the shadow domain maintains in each entity's txt DNS field their certificate number. If the value returned from the DNS lookup is identical to the certificate number, MS 206 can verify the signature, if the certificate number is different, MS 206 then discards the cached certificate and requests a new certificate.

To allow a membersite to enter identity management network 212 without adding in scripting functionality that allows key management, and shadow domain shifting, it is possible for MS 206 to have its shadow domain 216 associated with a third party that processes the reading of the homesite cookie, the redirection to HS 202 and the provision of the data provided by HS 202. Additionally, this third part can handle the signature checks required to verify the integrity of the received data. One skilled in the art will appreciate that this functionality can be provided by a single entity for numerous membersites.

One common request for existing single sign in services is the provision of a single sign out facility. To provide this, a membersite that has allowed a user to sign in, preferably modifies a cookie carried by user 200. This cookie tracks the membersites to which a user is logged in. In a presently preferred embodiment, the cookie provides a URL that will allow a user to log out. To sign out of services, user 200 returns to his homesite 202 and indicates that he wishes to log out of all services, or a subset thereof. The homesite 202 can then work through the URL's provided in the cookies to allow the user to have a single click sign off. Alternately, MS 206 can provide a logout link to user 200 that can either log user 200 out of MS 206, and remove the membersite reference in the cookie, or redirect user 200 to HS 202 so that the logout process described about can be pursued. In another embodiment, when HS 202 authenticates user 200 for MS 206, HS 202 can store in the user profile database a logout URL for MS 206. Thus, to log out, user 200 would visit HS 202 and request a list of sites at which a login is current, this list would also preferably provide the user with the ability to logout of any or all membersites.

The present invention provides users with simplified sign in and registration with membersites, allowing the user to visit a membersite, and indicate that they are part of the identity management network. This is preferably done by clicking on either an icon or a link on the sign in page. When this link has been clicked upon, MS 206 will retrieve the cookie identifying user 200, and will redirect user 200 to HS 202. In the case of simply signing in to MS 206, where a previous registration has been made the redirection to HS 202 is simply for authentication. If user 200 has not previously registered with MS 206, the redirection to HS 202 is for both authentication and for an information request. MS 206 can request a subset of the information stored at HS 202, using either a simple URL encoded redirection, or can request extensible information through the use of a query stored in a cookie carried by user 200. The redirection of user 200 to HS 202 sends user 200 to the shadow domain of HS 202, to ensure that HS 202 is still in the identity management network. After providing HS 202 with authentication credentials, and any required authorization for data transfer, user 200 is redirected to MS 206. The checks to ensure that both MS 206 and HS 202 are in the shadow domain, and thus are active in the identity management system are performed transparently to the user, and allow the user a simplified process for login and registration. Through the ability of MS 206 to pass information back to HS 202, user 200 is provided with a simplified mechanism for ensuring that HS 202 has updated and new information.

Because user 200 authenticates at HS 202 after a redirection from MS 206, user 200 is typically requires to verify that a correct redirection has been made by checking the URL which is typically in a navigation or location bar in the browser window. To provide additional security, HS 202 can store a series of user preferences, obtained from user 200, that define a user interface and experience. These preferences may include a user defined background page colour, a customized set of icons, a user defined greeting and a user selected language interface. These preferences can be obtained from user 200 at the time of registration, stored in the user profile database, and retrieved when user 200 is redirected for authentication. If a malicious party attempts to impersonate HS 202, the user defined preferences will be unavailable, and as a result, user 200 will be immediately aware that they have been redirected to the wrong site.

The hierarchical structure of the present invention provides a single point from which security breaches can be addressed, while the distributed nature of the homesites eliminates the single point of failure that releases user information. If the integrity of root 210 is compromised, removal of all root.net domains can be easily achieved by contacting DNS authorities, which will shut down the entire identity management network 212. This will prevent the release of any user information, and will prevent fictitious homesites from allowing user impersonation. If root 210 is comprised, there is no user specific data released as opposed to the Passport™ model. If a single homesite is compromised, its user data is released, but by removing it from the shadow domain, it is prevented from providing improper authentications, as it will be unable to retrieve cookies from the shadow domain. Thus, a compromised homesite can be effectively removed from the network in the time it takes an address update to be propagated through the DNS network. In the Liberty Alliance model, which provides no single point of failure, due to the complex key ring in the web of trust, there is no simple method of removing a compromised IDP from the web. Thus, the present invention, through its structure eliminates a single point of failure that will allow the release of user data, and provides a mechanism for isolating compromised homesites to prevent impersonations of users.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method, comprising:
    maintaining, by a root computing device, an information schema that includes one or more fields used to store information for a plurality of homesites, the information schema allowing one or more membersites to request the information from one or more of the plurality of homesites;
    updating the information schema by adding one or more new fields to the information schema for storing additional information for the plurality of homesites;
    responsive to receiving, by the root computing device, a schema-compliant request for information from the one or more membersites, sending requested information to the one or more membersites; and
    wherein the method further comprises:
    receiving a request for a shadow domain name resolution from a membersite for a shadow domain associated with a homesite;
    resolving a shadow domain name associated with the homesite to allow redirection from the membersite to the homesite;
    receiving a request for a shadow domain name resolution from a homesite for a shadow domain associated with a membersite; and
    resolving a shadow domain name associated with the membersite to allow redirection from the homesite to the membersite.

2. The method as recited in claim 1, further comprising assigning, by the root computing device, a globally unique identifier (GUID) to the one or more of the plurality of homesites for subsequent association with user identity information.

3. The method as recited in claim 2, further comprising enabling, by the root computing device, transfer of data associated with a first homesite to a second homesite by using the GUID and the information schema maintained by the root computing device.

4. The method as recited in claim 3, wherein the enabling is performed, at least in part by the root computing device, by issuing a challenge and, responsive to successful completion of a challenge response, issuing a directive to the first homesite to transfer schema-related information to the second homesite.

5. The method as recited in claim 1, further comprising administering a shadow domain that allows the one or more of the plurality of homesites to cause information exchange with the one or more membersites.

6. The method as recited in claim 5, wherein administering the shadow domain further comprises administering a shadow domain that is created under a namespace of the root.

7. A computer-readable device having instructions stored thereon that, responsive to execution by a computing device, causes the computing device to perform operations comprising:

maintaining, by a root computing device, an information schema that includes one or more fields used to store information for a plurality of homesites, the information schema allowing one or more membersites to request the information from one or more of the plurality of homesites;

updating the information schema by adding one or more new fields to the information schema for storing additional information for the plurality of homesites;

responsive to receiving, by the root computing device, a schema-compliant request for information from the one or more membersites, sending requested information to the one or more membersites; and wherein the operations further comprise:

receiving a request for a shadow domain name resolution from a membersite for a shadow domain associated with a homesite;

resolving a shadow domain name associated with the homesite to allow redirection from the membersite to the homesite;

receiving a request for a shadow domain name resolution from a homesite for a shadow domain associated with a membersite; and resolving a shadow domain name associated with the membersite to allow redirection from the homesite to the membersite.

8. The computer-readable device as recited in claim 7, wherein the operations further comprise enabling the one or more membersites to obtain encryption certificates for respective homesites.

9. The computer-readable device as recited in claim 7, wherein the operations further comprise providing a signed assertion to the one or more of the plurality of homesites, the signed assertion being configured to be used to indicate that an associated homesite is authorized to authenticate a user.

* * * * *

UNITED STATES PATENT AND TRADEMARK OFFICE
CERTIFICATE OF CORRECTION

PATENT NO. : 8,117,649 B2
APPLICATION NO. : 12/851464
DATED : February 14, 2012
INVENTOR(S) : Hardt Page 1 of 1

It is certified that error appears in the above-identified patent and that said Letters Patent is hereby corrected as shown below:

Title Page,

Page 3, item (56), under "Other Publications", in Column 1, Line 3, delete "Sytems" and insert -- Systems --.

Page 3, item (56), under "Other Publications", in Column 2, Line 33, delete "WWW.passport.com," and insert -- www.passport.com, --.

Page 3, item (56), under "Other Publications", in Column 2, Line 47, delete "Enonymous lnfomediary,"" and insert -- Enonymous Infomediary," --.

Page 5, item (56), under "Other Publications", in Column 2, Line 34, delete "HailStrom's" and insert -- Hailstorm's --.

Page 4, item (56), under "Other Publications", in Column 2, Line 53, delete "Preference (P3P) Syntex" and insert -- Preferences (P3P) Syntax --.

Signed and Sealed this
Seventh Day of August, 2012

David J. Kappos
*Director of the United States Patent and Trademark Office*